United States Patent
Guvenc

(10) Patent No.: US 9,986,440 B2
(45) Date of Patent: *May 29, 2018

(54) INTERFERENCE AND MOBILITY MANAGEMENT IN UAV-ASSISTED WIRELESS NETWORKS

(71) Applicant: Ismail Guvenc, Raleigh, NC (US)

(72) Inventor: Ismail Guvenc, Raleigh, NC (US)

(73) Assignee: The Florida International University Board of Trustees, Miami, FL (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/443,147

(22) Filed: Feb. 27, 2017

(65) Prior Publication Data

US 2017/0171761 A1 Jun. 15, 2017

Related U.S. Application Data

(63) Continuation of application No. 14/921,392, filed on Oct. 23, 2015, now Pat. No. 9,622,133.

(51) Int. Cl.
*H04M 11/04* (2006.01)
*H04W 16/22* (2009.01)
(Continued)

(52) U.S. Cl.
CPC ........ *H04W 16/22* (2013.01); *H04B 7/18504* (2013.01); *H04W 4/22* (2013.01);
(Continued)

(58) Field of Classification Search
CPC .......................... H04J 11/005; H04W 72/082
(Continued)

(56) References Cited

U.S. PATENT DOCUMENTS

| 8,983,682 B1 | 3/2015 | Peeters et al. |
| 2009/0280841 A1 | 11/2009 | Ofuji |

(Continued)

OTHER PUBLICATIONS

"Aerial Base Stations with Opportunistic Links for Unexpected & Temporary Events," *ABSOLUTE Project Whitepaper*, accessed from: http://www.absolute-project.eu/, Oct. 2012.

(Continued)

*Primary Examiner* — Kiet Doan
(74) *Attorney, Agent, or Firm* — Saliwanchik, Lloyd & Eisenschenk

(57) ABSTRACT

Techniques and systems are disclosed for addressing the challenges in interference and mobility management in broadband, UAV-assisted heterogeneous network (BAHN) scenarios. Implementations include BAHN control components, for example, at a controlling network node of a BAHN. Generally, a component implementing techniques for managing interference and handover in a BAHN gathers state data from network nodes or devices in the BAHN, determines a candidate BAHN model that optimizes interference and handover metrics, and determines and performs model adjustments to the network parameters, BS parameters, and UAV-assisted base station (UABS) device locations and velocities to conform to the optimized candidate BAHN model. Also described is a UABS apparatus having a UAV, communications interface for communicating with a HetNet in accordance with wireless air interface standards, and a computing device suitable for implementing BAHN control or reinforcement learning components.

20 Claims, 11 Drawing Sheets

(51) Int. Cl.
| | |
|---|---|
| H04B 7/185 | (2006.01) |
| H04W 36/20 | (2009.01) |
| H04W 4/22 | (2009.01) |
| H04W 16/14 | (2009.01) |
| H04W 76/02 | (2009.01) |
| H04W 16/28 | (2009.01) |
| H04W 84/04 | (2009.01) |

(52) U.S. Cl.
CPC ............. *H04W 4/90* (2018.02); *H04W 16/14* (2013.01); *H04W 16/28* (2013.01); *H04W 36/20* (2013.01); *H04W 76/025* (2013.01); *H04W 76/15* (2018.02); *H04W 84/042* (2013.01)

(58) Field of Classification Search
USPC ....... 455/456.1, 404.1, 408, 411, 452.1, 416, 455/422.1, 441, 458, 423; 340/870.02; 370/237; 706/15
See application file for complete search history.

(56) References Cited

U.S. PATENT DOCUMENTS

| | | | | |
|---|---|---|---|---|
| 2010/0273504 | A1* | 10/2010 | Bull | G01S 5/02 455/456.1 |
| 2012/0028627 | A1* | 2/2012 | Hunzinger | H04W 36/0083 455/422.1 |
| 2014/0087721 | A1 | 3/2014 | Dimou | |
| 2014/0213271 | A1* | 7/2014 | Lee | H04L 5/0032 455/452.1 |
| 2014/0220923 | A1 | 8/2014 | Shoshan et al. | |
| 2015/0045040 | A1* | 2/2015 | Lai | H04W 36/32 455/441 |
| 2015/0092676 | A1 | 4/2015 | Periyalwar | |
| 2015/0312837 | A1* | 10/2015 | Baldwin | H04W 4/046 370/237 |
| 2016/0009413 | A1* | 1/2016 | Lee | B64F 1/007 701/16 |
| 2016/0150427 | A1* | 5/2016 | Ramanath | H04W 24/06 370/252 |

OTHER PUBLICATIONS

"The Mobile Broadband Standard: LTE in unlicensed spectrum," *3GPP*, accessed from http://www.3gpp.org/news-events/3gpp-news/1603-lte in unlicensed, Jun. 19, 2014, pp. 1-4.
Andrews, Jeffrey G. et al., "A Primer on Spatial Modeling and Analysis in Wireless Networks," *IEEE Communications Magazine*, Nov. 2010, pp. 1-9.
Auer, Peter et al., "Finite-time Analysis of the Multiarmed Bandit Problem*," *Machine Learning*, 2002, 47:235-256.
CableLabs. "CableLabs Perspectives on LTE-U Coexistence with Wi-Fi and Operational Modes for LTE-U," *Cable Television Laboratories, Inc.*, 2014, pp. 1-15.
Cavalcante, André M. et al., "Performance Evaluation of LTE and Wi-Fi Coexistence in Unlicensed Bands,"*Proc. IEEE Vehicular Technology Conference (VTC)*, Jun. 2013, pp. 1-6.
Chen, Wei et al., "Combinatorial Multi-Armed Bandit: General Framework, Results and Applications," *Proc. Int. Conf. Machine Learning (ICML)*, Atlanta, Georgia, 2013.
Chen, Yangyang et al. "Downlink Capacity Gain Analysis of Mobile Relay in LTE-Advanced Network," *Proc. IEEE Consumer Communications & Networking Conference (CCNC)*, 2014, pp. 1-7.
Doshi, Finale et al., "Reinforcement Learning with Limited Reinforcement: Using Bayes Risk for Active Learning in POMDPs," *Proc Int Conf Mach Learn*, 2008, 301:256-263.
Gai, Yi et al., "Learning Multiuser Channel Allocations in Cognitive Radio Networks: A Combinatorial Multi-Armed Bandit Formulation," *Proc. IEEE Int. Symp. New Frontiers in Dynamic Spectrum*, Apr. 2010, pp. 1-9.

Galindo-Serrano, Ana et al., "Self-organized Femto-to-Macro Interference Coordination with Partial Information," *Proc. IEEE Int. Symp. Personal, Indoor and Mobile Radio Communications (PIMRC) Workshops*, 2013, pp. 111-116.
Galindo-Serrano, Ana et al., "Self-organized Femtocells: a Fuzzy Q-Learning Approach," *Wireless Networks*, 2014, 20(3):441-455.
Grffiths, Thomas L. et al., "The Indian Buffet Process: An Introduction and Review," *Journal of Machine Learning Research*, 2011, 12:1185-1224.
Harmon, Mance E. et al., "Reinforcement Learning: A Tutorial," *WL/AAFC, WPAFB Ohio*, 1996, 45433:1-17.
Huang, Longbo et al., "The Power of Online Learning in Stochastic Network Optimization," *arXiv*, Apr. 2014, accessed from: http://arxiv.org/pdf/1404.1592.pdf.
Liu, Dantong et al., "Opportunistic User Association for Multi-Service HetNets Using Nash Bargaining Solution," *IEEE Communications Letters*, Mar. 2014, 18(3):463-466.
López-Pérez, David et al., "Enhanced Intercell Interference Coordination Challenges in Heterogeneous Networks," *IEEE Wireless Communications*, Jun. 2011, pp. 22-30.
Merwaday, Arvind et al., "Capacity Analysis of LTE-Advanced HetNets with Reduced Power Subframes and Range Expansion,"*EURASIP J. Wireless Commun. Networking, 2014*, pp. 1-34.
Osseiran, Afif et al., "The foundation of the Mobile and Wireless Communications System for 2020 and beyond: Challenges, Enablers and Technology Solutions," *Proc. IEEE Vehicular Technology Conference (VTC Spring)*, 2013, pp. 1-5.
Pedersen, Klaus Ingemann et al., "Carrier Aggregation for LTE-Advanced: Functionality and Performance Aspects," *IEEE Communications Magazine*, 2011, 49(6):89-05.
Qualcomm. "Extending LTE Advanced to unlicensed spectrum," *Qualcomm Incorporated*, Dec. 2013, pp. 1-12.
Rohde, Sebastian et al., "Ad hoc self-healing of OFDMA networks using UAV-based relays," *Ad Hoc Networks*, 2013, 11:1893-1906.
Ross, Stéphane et al., "Learning to Play a Satisfaction Equilibrium," *Advances in Artificial Intelligence*, 2006, pp. 61-72.
Rotondo, Rick. "The Potential for Unlicensed Spectrum: Can cognitive radio help mission-critical users take advantage of unlicensed spectrum opportunities?" *RadioResource: Mission Critical Communications*, Aug. 2011, pp. 1-4.
Samsung. "Mobility support to pico cells in the co-channel HetNet deployment," *3GPP TSG RAN WG2#70bis*, Jun. 28-Jul. 2, 2010, Stockholm, Sweden, pp. 1-9.
Schmidt, Volker. "Random Point Processes: Models, Characteristics and Structural Properties," Söllerhaus-Workshop, Mar. 2006, pp. 1-151.
Scott, Steven L. "A modern Bayesian look at the multi-armed bandit," *Appl. Stochastic Models Bus. Ind.*, 2010, 26:639-658.
Settles, Burr. "Active Learning Literature Survey," *Computer Sciences Technical Report 1648*, University of Wisconsin-Madison, updated on: Jan. 26, 2010, pp. 1-67.
Simsek, Meryem et al., "Context-Aware Mobility Management in HetNets: A Reinforcement Learning Approach," *IEEE Globecom Workshops*, Dec. 2014.
Simsek, Meryem et al., "Improved Decentralized Q-learning Algorithm for Interference Reduction in LTE-Femtocells," *Proc.Wireless Advanced (WiAd)*, London, UK, Jun. 2011, pp. 138-143.
Simsek, Meryem et al., "Learning Based Frequency- and Time-Domain Inter-Cell Interference Coordination in HetNets," *IEEE Trans. Vehic. Technol.* (2nd round major revision), May 2014.
Simsek, Meryem et al., "Mobility management in HetNets: a learning-based perspective," *EURASIP Journal on Wireless Communications and Networking*, 2015, pp. 1-13.
Sony. "Requirements and Coexistence Topics for LTE-U," *3GPP LTE-U Workshop*, Sophia Antipolis, France, Jun. 13, 2014, pp. 1-11.
Sui, Yutao et al., "Moving Cells: A Promising Solution to Boost Performance for Vehicular Uses," *IEEE Communications Magazine*, 2013, 51(6):62-68.
Sui, Yutao et al., "Performance Study of Fixed and Moving Relays for Vehicular Users with Multi-cell Handover under Co-channel Interference," *IEEE International Conference on Connected Vehicles and Expo*, 2013, pp. 1-7.

(56) References Cited

OTHER PUBLICATIONS

Vlassis, Nikos et al., "Bayesian Reinforcement Learning," *Reinforcement Learning*, 2012, pp. 359-386.
Wu, Bo et al., "Model-based Bayesian Reinforcement Learning in Factored Markov Decision Process," Journal of Computers, Apr. 2014, 9(4):845-850.
Yuan, Guangxiang et al., "Carrier Aggregation for LTE-Advanced Mobile Communication Systems," *IEEE Communications Magazine*, Feb. 2010, pp. 1-6.

\* cited by examiner

INTERFERENCE AND MOBILITY MANAGEMENT IN UAV-ASSISTED WIRELESS NETWORKS

CROSS-REFERENCE TO RELATED APPLICATION

This application is a continuation application of U.S. application Ser. No. 14/921,392, filed Oct. 23, 2015, the disclosure of which is hereby incorporated herein by reference in its entirety, including any figures, tables, and drawings.

GOVERNMENT SUPPORT

This invention was made with government support under grant number CNS-1453678 awarded by the National Science Foundation. The government has certain rights in the invention.

BACKGROUND

Public safety communications (PSCs) are critically important to save lives, property, and national infrastructure in case of incidents such as fires, terrorist attacks, or natural disasters. Until recently, PSC has been handled through narrowband communication technologies such as land mobile radio (LMR). Narrowband communication technologies can deliver reliable voice communications, but do not support broadband data and are also often limited in terms of coverage and interoperability. The National Broadband Plan by the FCC states that a cutting-edge PSC shall make use of broadband technologies "to allow first responders anywhere in the nation to send and receive critical voice, video and data to save lives, reduce injuries and prevent acts of crime and terror," while acknowledging that "the U.S. has not yet realized the potential of broadband to enhance public safety" [1].

Broadband wireless technologies such as the 4G Long Term Evolution (LTE) and its 5G successor have a strong potential for revolutionizing communications during public safety situations. Driven by the need to meet the exponential increase in the demand for the wireless spectrum, research and standardization activities for 5G wireless networks are already underway, with an ambitious goal of 1000× capacity enhancement, 10× cell-edge user rate enhancement, and a 10× (to 1 ms) roundtrip latency reduction over 4G systems.

An important opportunity for revolutionizing PSC capabilities is to introduce unmanned aerial vehicles (UAVs), such as balloons, quadcopters, or gliders, for delivering pervasive broadband connectivity. Enabled by recent technological advances, miniaturization, and open-source hardware/software initiatives, UAVs have found several key applications recently. Amazon®, for example, is investigating using UAVs for rapid package delivery. Google® and Facebook® have been investigating the use of a network of high-altitude balloons and drones over specific population centers for providing broadband connectivity. Such solar-powered drones are capable of flying several years without refueling.

A relatively less explored application of UAVs is to deliver broadband data rates in emergency and public safety situations through low-altitude platforms [2]. UAVs are well-suited for such PSC scenarios due to their mobility and self-organization capabilities, which are valuable for quickly delivering broadband connectivity at times and locations where most needed, through an agile, low cost, and ubiquitous communication infrastructure.

BRIEF SUMMARY

Techniques and systems are disclosed for addressing the challenges in interference and mobility management in broadband, UAV-assisted heterogeneous network (BAHN) scenarios.

Embodiments of the subject invention may provide advantages in a variety of PSC scenarios, as well as in more generalized HetNet scenarios consisting of small-cell base stations such as picocells and femtocells. For example, in a public safety scenario, a large-scale implementation of a BAHN can provide capable PSCs in disaster-affected environments following the aftermath of, e.g., an earthquake, tsunami, or hurricane. In such environments, however, there is a vital need to maintain broadband, high-speed communication between first responders and victims, whose basic communication mediums may be jeopardized by damaged networking infrastructure.

Embodiments of the subject invention can include BAHN control components that may be implemented, for example, at a controlling network node of a BAHN. Generally, a component implementing techniques for managing interference and handover in a BAHN gathers state data from network nodes or devices in the BAHN, determines a candidate BAHN model that optimizes interference and handover metrics, and determines and performs model adjustments to the network parameters, BS parameters, and UAV-assisted base station (UABS) device locations and velocities to conform to the optimized candidate BAHN model.

Some embodiments include a reinforcement learning component implementing techniques for autonomous model adjustments by a controlling node or individual base station devices.

Certain embodiments of the subject invention include a UABS apparatus having a UAV, communications interface for communicating with a HetNet in accordance with wireless air interface standards, and a device executing program instructions for BAHN control or reinforcement learning components.

Example implementation platforms and experimental results are also provided.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Techniques and systems are disclosed for addressing the challenges in interference and mobility management in broadband, UAV-assisted heterogeneous network (BAHN) scenarios. Embodiments of the subject invention may provide advantages in a variety of PSC scenarios, as well as in more generalized HetNet scenarios consisting of small-cell base stations such as picocells and femtocells.

One public safety scenario involving a large-scale or far-ranging implementation of a BAHN can provide capable PSCs in disaster-affected environments following the aftermath of, e.g., an earthquake, tsunami, or hurricane. In such environments, there is a vital need to maintain broadband, high-speed communication between first responders and victims, whose basic communication mediums may be jeopardized by damaged networking infrastructure.

Figure 1:
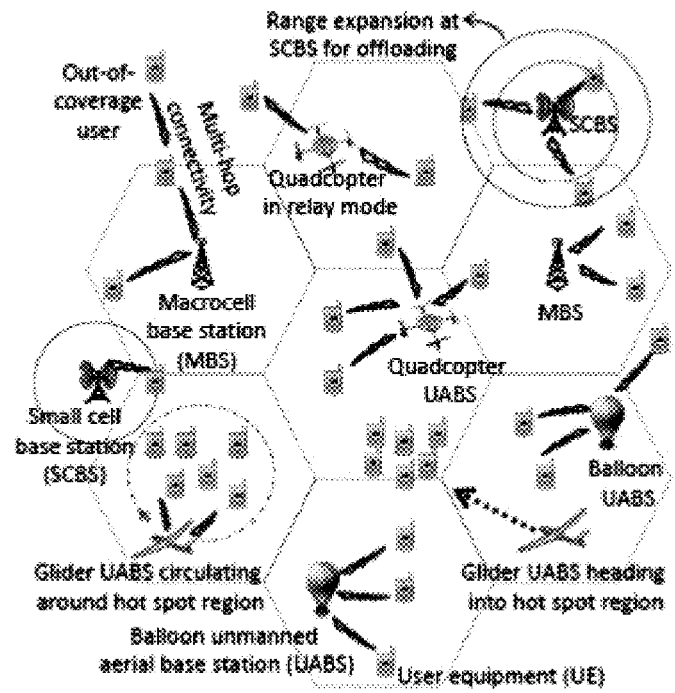
FIG. 1 shows a representative broadband, UAV-assisted heterogeneous network (BAHN) scenario in a disaster-affected environment.

FIG. 1 shows a representative BAHN scenario in a disaster-affected environment. In FIG. 1, only two of the seven macrocell base stations (MBSs) with large coverage areas remain operational after a disaster. The figure also illustrates a number of small-cell base stations (SCBSs), a type of base station (BS) that can provide wireless service within smaller hot-spot areas. In some cases, range expansion techniques may be used to extend the coverage of the SCBSs and fairly distribute users among different cells.

To sustain ubiquitous broadband connectivity, FIG. 1 shows how different types of UAVs may serve as unmanned aerial base stations (UABSs). In hot-spot regions with denser user equipment (UE) population, quadcopters and balloons can hover at a fixed location, while gliders can follow a circular trajectory. In some cases, relaying and multi-hop communication methods can also be used for extending the coverage through the incident scene, either through UAVs or other UEs.

Figure 2:
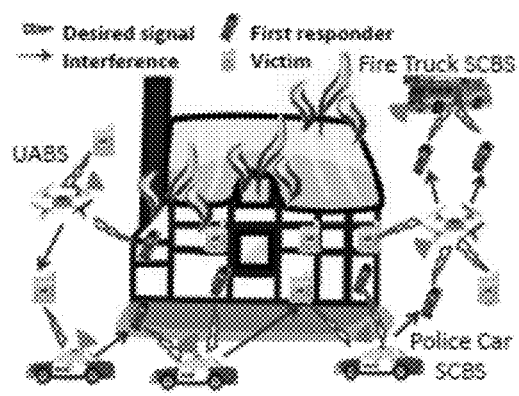
FIG. 2 shows a representative BAHN scenario in a small scale emergency environment.

Another kind of public safety scenario involves a smaller-scale BAHN environment representative of events such as a building on fire or a barricaded suspect. As shown in the example of FIG. 2, the incident scene is served by a number of SCBSs which are embedded into police cars, fire trucks, and UAVs. These SCBSs can provide broadband connectivity to first responders and victims in a timely manner, typically for deep situational awareness purposes through real-time wireless video streaming. Some example uses of broadband connectivity in a small-scale environment include: transmission of 3D blueprints of a burning building to the hand-held devices of first responders; live streaming of high definition video of the incident scene from cap-mounted cameras other wearable devices to a command center; and transmission of multichannel vital signs of an injured disaster victim to an external medical post to facilitate collaboration between on-site emergency medical staff and remote specialists. Taking advantage of UAV mobility, broadband connectivity can be delivered into desired regions, including congested areas and indoor environments.

However, introducing BAHNs into PSC scenarios such as these can pose challenges. In contrast to traditional cellular networks, in which the infrastructure consists of fixed BSs at pre-determined locations, BAHNs are characterized by a dynamically mobile network infrastructure with BSs that can potentially change their position in all three dimensions. One challenge introduced by this new architecture is maintaining pervasive broadband connectivity and coverage throughout the incident area. The goal of pervasive broadband connectivity is undermined by the dynamically varying interference patterns being generated by mobile SCBSs and/or UABSs. Since the final locations of mobile base stations may not always be controlled, the resulting interference challenges are significantly more complex and dynamic when compared with traditional heterogeneous cellular network (HetNet) scenarios.

Another challenge involves seamlessly transferring connectivity among different BSs, which is exacerbated by the presence of high-velocity, mobile UABSs and PSC apparatuses interacting with conventional low-speed nodes such as human-carried mobile devices.

Embodiments of the subject invention include techniques for a managing interference and handover in a BAHN. BAHN control components implementing techniques and systems of the subject invention may be found, for example, at a controlling network node of a BAHN. A controlling network node can be, e.g., a centrally located or "master" MBS node that operates to control network connectivity across a range of base stations. In some cases, each individual MBS node may operate to provide interference and handover management capabilities for the SCBS and UABS devices within its network zone. Such controlling nodes may be referred to as a "base station control node."

Generally, a component implementing techniques for managing interference and handover in a BAHN gathers state data from network nodes or devices in the BAHN, determines a candidate BAHN model that optimizes interference and handover metrics, and determines and performs model adjustments to the network parameters, BS parameters, and UABS locations and velocities to conform to the optimized candidate BAHN model.

Model adjustments can include, for example, network parameters such as the scheduling threshold for transitioning user equipment devices to a different base station, BS parameters such as a power reduction factor, and changing the location, height or speed of a UABS to move it to a more effective location. Types of model adjustments are explored in more detail in additional embodiments.

Model adjustments to conform to a candidate BAHN model may be made continuously and autonomously by the component. For example, as UABS devices and UEs move around the physical space serviced by the BAHN, or as more or fewer UEs are present within the BAHN network service area, the BAHN mode may need adjustment to maintain satisfactory optimization. Such adjustments may occur many times per second under some conditions.

"State data" can include, for example, locations in 3-D space and velocities of BS devices. Since SCBS and UABS devices may move, for example, to different locations or heights, their current and future locations may be relevant to determining the candidate model for the next time cycle. In a PSC scenario, SCBS devices may be present on moving ground vehicles, such as fire trucks. UABS devices are often flying or circling inside a zone. State data can also include, for example, operating parameters, such as the current broadcast power ranges, power reduction factors, biases for range expansion, scheduling thresholds, the operating state of certain BS features or capabilities, system throughput, or other performance metrics such as SINR. Virtually any operating parameter or condition that a network communications standard (e.g., LTE) is capable of gathering and transmitting from base stations or UEs may be state data that is used to determine the candidate BAHN model.

"Base station devices" refer to devices in the BARN that provide radio coverage to user equipment devices. Base station devices can include a number of categories of devices; for example, macrocell base stations (MBS), small cell base stations (SCBS), as well as the unmanned aerial base station (UABS) apparatus described herein. Base station devices can also include microcell, picocell, and femtocell base stations. Generally, what distinguishes an MBS from an SCBS (or smaller BS) is the size of its radio coverage area, which is often a function of the size, height, elevation, and transmission power of the antenna.

Base station devices may also include devices arranged in a distributed radio access network, such as a Cloud Radio Access Network (C-RAN) architecture. (C-RAN is also known as "Centralized-RAN.") A C-RAN base station device includes a number of Remote Radio Heads (RRHs) connected to a baseband unit (BBU), for example, by using CPRI (Common Public Radio Interface) or OBSAI (Open Base Station Architecture Initiative) interfaces. Each RRH includes the radio, the associated amplification/filtering, and the antenna. The BBU is implemented separately and performs the centralized signal processing functionality of the RAN. The decentralized BBU enables agility, faster service delivery, cost savings, and improved coordination of radio capabilities across a set of RRHs. In some cases, the architecture can be further decentralized using a virtualized-RAN (V-RAN) architecture. A V-RAN essentially virtualizes the BBU functionality into a centralized BBU pool, allowing software-based network scaling.

Some embodiments of the subject invention include techniques and systems for self-organizing interference management and load balancing in BAHN environments.

Even though two powerful features of LTE are its inter-cell interference coordination (ICIC) and load balancing capabilities, scenarios such as in FIG. 1 and FIG. 2 are particularly unique and challenging when compared with conventional HetNet interference management techniques [3, 4, 5]. Interference management can be difficult during disaster scenarios for a variety of reasons, for example: 1) potentially damaged BS infrastructure, yielding outage problems; 2) mobility of SCBSs in UAVs, police cars, and fire trucks, resulting in dynamic interference patterns and uncoordinated final locations of SCBSs; 3) dynamically changing locations of UEs following a disaster, potentially clustered into a few hot-spot areas; 4) heterogeneous network traffic with bursty data transmission (e.g., post-earthquake) which may temporarily overload the network infrastructure; and 5) the need to maintain high QoS for public safety personnel in mission-critical scenarios.

Figure 3:
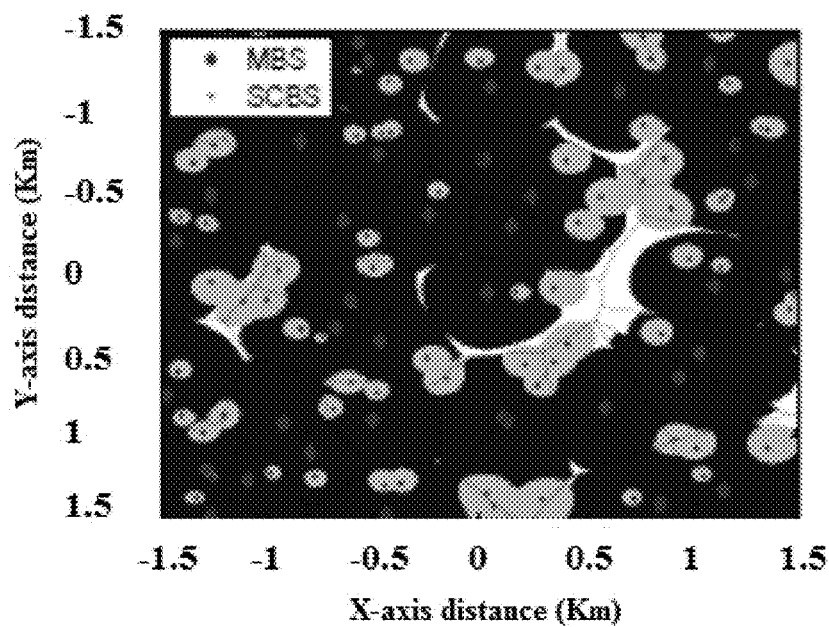
FIG. 3 shows a heterogeneous network (HetNet) region in normal operating conditions.

To illustrate the impact of infrastructure loss on coverage and throughput, an example 3×3 $km^2$ HetNet region, prior to an earthquake, is shown in FIG. 3. An MBS (SCBS) density of 4.6 per $km^2$ (9.2 per $km^2$) is considered, while the MBS (SCBS) transmit power is set to 46 dBm (30 dBm). The UE density is 400 users per $km^2$, uniformly distributed over the geographical area with full-buffer traffic. Since achieving broadband rates is considered as a major goal, a UE is considered to be in "outage" if its throughput is lower than a threshold, set here to $3.5 \times 10^{-3}$ bps/Hz. In FIG. 3, darker-shaded regions with diamond-shaped indicators correspond to the coverage areas of MBSs, and lighter-shaded regions with dot-shaped indicators correspond to coverage areas SCBSs. White areas indicate where throughput is in "outage," minimal here.

Figure 4:
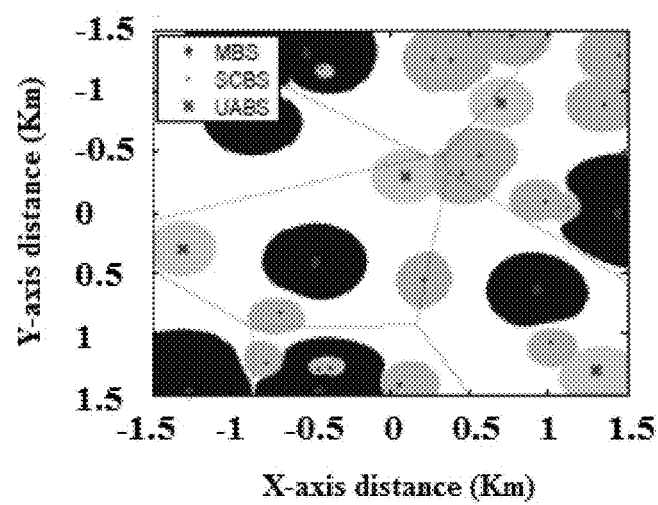
FIG. 4 shows a post-disaster scenario in which 80% of the master and small-cell base stations are randomly destroyed.

FIG. 4 shows a post-disaster scenario in which 80% of the MBSs and SCBSs are randomly destroyed. The same throughput threshold as in FIG. 3 is used to calculate outage regions. In the post-disaster view, the area of white outage regions grows significantly. The increase in outage areas may be due to, for example, overloading of the BSs with many UEs, and poor link quality for the UEs far away from the BSs. Therefore, in a post-disaster PSC scenario, first responders and victim users located within a white region in FIG. 4 will observe very low throughput, and in some cases a complete outage and loss of connectivity. Naturally, if higher throughput thresholds are required, the outage region will grow even larger.

Figure 5:
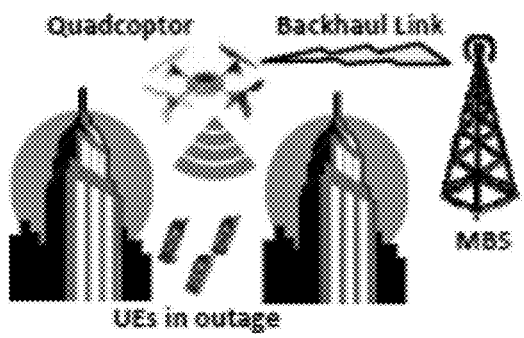
FIG. 5 depicts a UAV communicating over a backhaul link.

Further illustrated in FIG. 4 is an optimized placement (through brute force search) of four UAVs (with UABSs) such as to maximize the fifth percentile throughput over the whole network. Each UAV is assumed to know the locations of other UAVs and BSs. In the example, the UAVs are shown to be clustered around the cell edges in order to take over the low signal-to-noise-ratio UEs in an effort to maximize fifth percentile rate. As shown in the example environment in FIG. 5, it is assumed that UAVs can communicate through a backhaul link to a nearby BS node on mobile relays using wireless backhauls (see, e.g., [6-11]).

Figure 6:
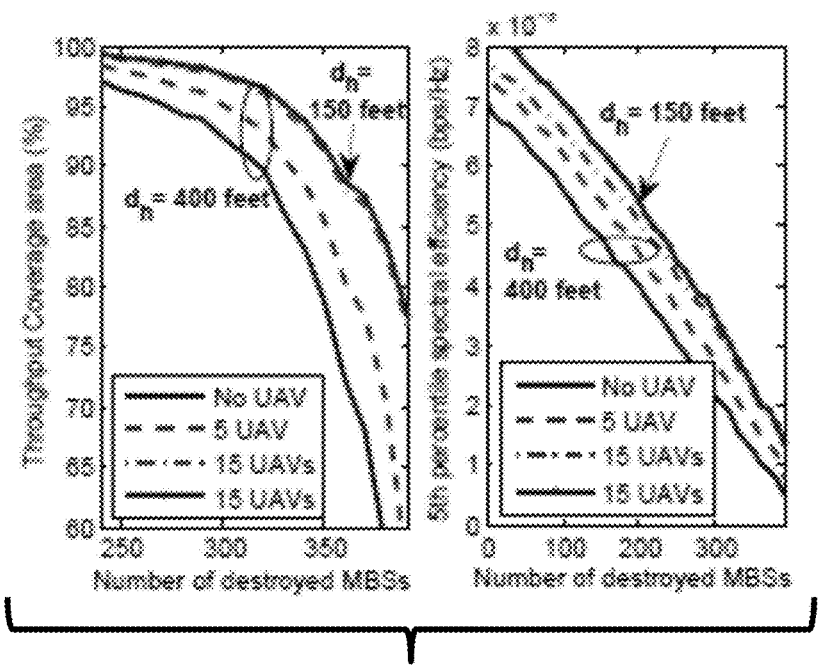
FIG. 6 shows example results with the throughput coverage area and the 5th percentile spectral efficiency (SE) as a function of the number of destroyed MBSs.

The ability of UABSs to move to any location and height in reference to an incident area provides a powerful mechanism to maintain high throughput coverage throughout the network. An example implementation shows how an optimized deployment of UABSs can improve the network throughput for the scenario described in FIG. 4. The throughput coverage area and the 5th percentile spectral efficiency (SE) as a function of the number of destroyed MBSs (out of a total 400) are shown in FIG. 6, with different number of helper UABSs. The throughput coverage area is defined as the percentage of area with throughput larger than a threshold, versus the whole simulation area. These results show that the height ($d_h$) of a UABS has a relatively limited effect on throughput coverage, but has a more pronounced effect on the 5th percentile throughput due to path loss factors. FIG. 6 also shows that 15 optimally-positioned UAVs can handle the load of up to 70 MBSs from a throughput coverage area perspective, while the gains are lower when the 5th percentile spectral efficiency is considered. Lowering the UAV height (assuming line-of-sight scenarios) is also shown to bring additional spectral efficiency benefits due to lower path loss.

The results in FIG. 6 demonstrate that UABSs may help significantly in minimizing throughput outage. However, in typical public safety scenarios where a large number of UEs are clustered in hot-spot areas, several UABSs and SCBSs may need to be positioned close to each other for sustaining high-throughput for all UEs. This close proximity of UABSs and SCBSs may cause severe and dynamic interference conditions.

Figure 7:
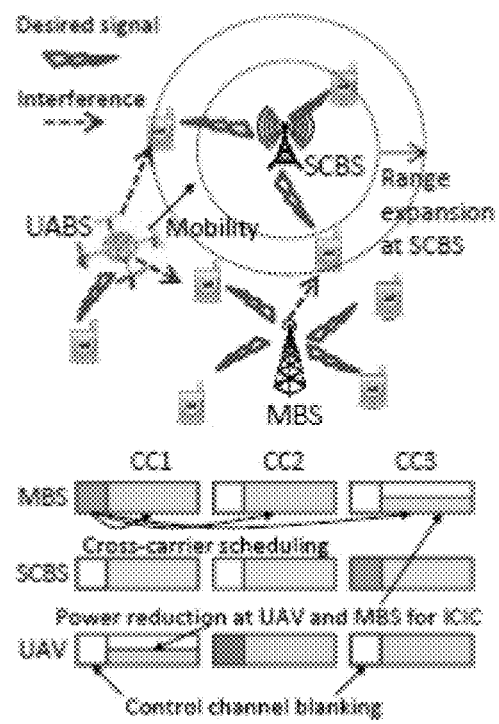
FIG. 7 shows an example BAHN scenario in which UABS mobility, ICIC, and load balancing techniques are jointly deployed.

An example BAHN scenario in which UABS mobility, ICIC, and load balancing techniques are jointly deployed is shown in FIG. 7. In this scenario, the MBS and UABS can generate interference to the UEs on the expanded range [13, 4, 12] of an SCBS, which is utilized to offload UEs from the overloaded MBS. Moreover, the UABS may also be positioned so as to offload more UEs from the MBS, at the expense of introducing further interference to the MBS.

Embodiments of the subject invention include techniques for a mobility-based ICIC (mICIC) to address these interference challenges. Such techniques may be implemented as an aspect of BAHN controller components to optimize interference and load balancing in the BAHN.

To optimize the candidate model for interference and load balancing, mICIC techniques can jointly and dynamically adjust certain parameters, in some cases at each individual BS. One category of parameter that can be adjusted is the duty cycle and/or pattern of reduced-power resources. This can include, for example, using component carrier (CC) bands, subframes, or modifying beam directions using a 3D beamforming capability for interference management (Y. Li, X. Ji, M. Peng, Y. Li, and C. Huang, "An enhanced beamforming algorithm for three dimensional MIMO in LTE-advanced networks," in Proc. IEEE Int. Conf. Wireless Communications & Signal Processing (WCSP), 2013, pp. 1-5; Y. Li, X. Ji, D. Liang, and Y. Li, "Dynamic beamforming for three-dimensional MIMO technique in LTE-Advanced networks," International Journal of Antennas and Propagation, vol. 2013, 2013; J. Koppenborg, H. Halbauer, S. Saur, and C. Hoek, "3d beamforming trials with an active antenna array," in Proc. Int. ITG Workshop on Smart Antennas (WSA), 2012, pp. 110-114; Y. Song, X. Yun, S. Nagata, and L. Chen, "Investigation on elevation beamforming for future LTE Advanced," in Proc. IEEE Int. Conf. Commun. (ICC) Workshops, 2013, pp. 106-110; M. Sharawi, D. Aloi, and O. Rawashdeh, "Design and implementation of embedded printed antenna arrays in small UAV wing structures," Antennas and Propagation, IEEE Transactions on, vol. 58, no. 8, pp. 2531-2538, August 2010; M. Sharawi, "Dual element monopole antennas embedded in small UAV wing structures with beamsteering capability," Journal of Electromagnetic Waves and Applications, vol. 24, no. 11-12, pp. 1633-1645, 2010; M. A. Ibrahim and M. S. Sharawi, "An embedded planar antenna array within UAV structures," February 2012; all of which are incorporated herein in their entirety).

Another category of parameter that can be adjusted is the power-reduction factor for reduced-power resources. Another type of parameter that can be adjusted is the "range expansion bias" at SCBSs and UABSs for offloading UEs. Another type of parameter that can be adjusted is the scheduling threshold for moving UEs among different resource types. In addition, three dimensional locations and velocities of the UABS devices can be adjusted in order to reduce interference between BS coverage zones.

Some embodiments of the subject invention may incorporate carrier-aggregation-based ICIC techniques. In FIG. 7, as an example, a carrier-aggregation-based ICIC approach is illustrated, which is a powerful feature of LTE-Advanced systems [14, 15]. Using carrier aggregation, the MBSs, SCBSs, and UABSs can aggregate multiple CC bands to achieve higher throughput, albeit at different transmission power levels in different bands. For example, the SCBS and the MBS can schedule their interfered UEs in lower-interference CCs. Note that the ICIC techniques in LTE utilize a logical X2 interface between the BSs, e.g., through microwave backhaul. Even in scenarios where X2 is not supported, however, some embodiments of the subject invention do not rely on an X2 interface.

In PSC scenarios with large cell sizes or dense UE populations, the bandwidth allocated to PSC users may not be sufficient to sustain high throughput. In some cases, unlicensed bands may have significant potential to enhance PSC data rates [16]. Therefore, some embodiments of techniques and systems may incorporate the ICIC of LTE using unlicensed bands [17-25]. Use of frequency bands in the unlicensed spectrum allows UEs to boost coverage or capacity within an area by providing an additional communications channel. In some scenarios, the unlicensed 5 GHz band already populated by Wi-Fi devices may be used. Examples of technologies utilizing unlicensed bands in carrier aggregation scenarios include LTE in Unlicensed Spectrum (LTE-U) and License Assisted Access (LAA).

LTE-U shares space with Wi-Fi equipment already inhabiting the 5 GHz band (e.g., smartphones, laptops and tablets connecting to home broadband networks). LTE-U is intended to let cellular networks boost data speeds over short distances without requiring the user to login to a separate Wi-Fi network. A control channel using LTE remains, but all data, including voice, flows over the unlicensed 5 GHz band instead of over the carrier's frequencies.

License Assisted Access (LAA) is similar to LTE-U, but uses a contention protocol known as listen-before-talk (LBT), mandated in some European countries, to coexist with other Wi-Fi devices on the same band.

Cellular networks typically occupy bands lower on the spectrum, where carrier waves tens of centimeters long (e.g., hundreds of megahertz) pass easily around obstacles and through the air. However, in some embodiments, UEs and base stations may communicate over millimeter wave bands. Millimeter wave equipment operates at or near "millimeter-wave" frequencies (3 to 300 gigahertz).

In certain embodiments, UE devices may be simultaneously connected to multiple base station devices using one or more communication bands. For example, a single UE may connect to an MBS over a carrier LTE band at the same time as it connects to one SCBS over LTE-U and to another SCBS using a millimeter wave band.

Another embodiment of the subject invention may use certain techniques for determining optimized base station distribution in the candidate BAHN model. Such embodiments may extend the use of homogenous Poisson point processes (HPPP) with stochastic geometry tools for analytically characterizing results such as those obtained using simulations in FIG. 6. As FIG. 4 shows, with optimized UABS placement, the BS topology moves away from a HPPP. This topology may be captured through the use of Poisson hardcore processes [26, 27] that dictate a minimum distance between the nodes. For hot-spot UE locations where many UABSs get clustered around a geographical region, use of mattern-cluster, Gibbs, and Strauss processes may be used for determining optimized BS location distributions in BAHN PSC scenarios [13].

Some implementations may assume that global information such as UE locations, link qualities, and traffic demands are available at all the UAVs and/or a command center. Such implementations may, for example, may use backhaul channels to exchange state data between the UABS, MBS, and SCBS devices. In some embodiments, state data from a BS may be communicated to a secondary BS which provides the backhaul channel from the primary BS to other BS devices.

In practice, however, such global knowledge may not be available at the UABSs, which would then need to explore their environment, learn from their actions, and subsequently optimize their actions to maximize the network coverage and throughput. Therefore, in some embodiments, multi-agent reinforcement learning algorithms [32-42], which offer a distributed learning and acting framework, are provided for mICIC and load balancing in BAHNs. Such techniques may be implemented by a reinforcement learning component present on BS devices such as the UABS.

Figure 8:
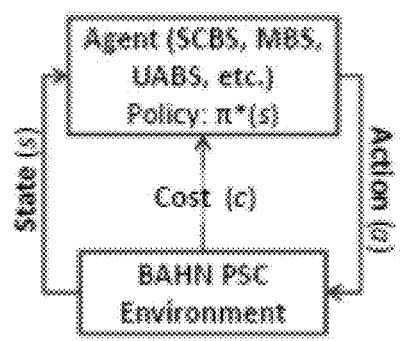
FIG. 8 shows an example process framework for applying reinforcement learning into BAHN mICIC and load balancing.

FIG. 8 shows an example process framework for applying reinforcement learning into BAHN mICIC and load balancing. Generally, a set P of SCBSs, set M of MBSs, and set of UABSs/drones are considered as the agents/players/actors in a BARN scenario. A set of states S and actions A are aimed at finding a policy that minimizes the observed costs over the interaction time of the agents. Every agent explores its environment, observes its current state s, and takes a subsequent action a according to its decision policy $\pi:s \rightarrow a$.

Figure 9:
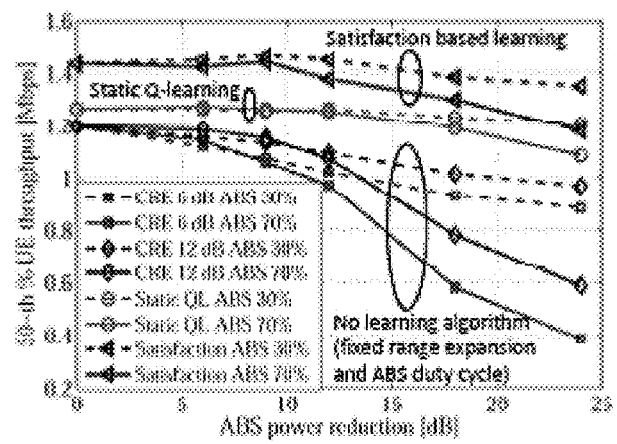
FIG. 9 shows example preliminary results for embodiments using Q-learning (QL) and satisfaction-based learning in a HetNet scenario.

The process framework of FIG. 9 can be used, in varying embodiments, with different reinforcement learning algorithms, such as Q-learning [28], multi-armed bandit (MAB) techniques [29], and satisfaction-based learning [30, 31].

In some embodiments, a Q-learning approach can be used to achieve interference management and load balancing in a BAHN. In the Q-learning approach, every "agent" (e.g., SCBS, MBS, UABS) in the BAHN maintains an individual Q-table that represents its knowledge of the environment. These Q-tables are then used to make autonomous decisions based on local and limited information. Q-learning sometimes converges into optimal values for Markov decision processes (MDPs), where the goal of a player is to find an optimal policy $\pi^*(s)$ for each state s, minimizing the cumulative costs over time.

In one embodiment, the BAHN mICIC and load balancing problem can be transformed into a Q-learning problem by dividing it into the following sub-problems: 1) bias value selection, 2) power allocation (full power or reduced power to minimize interference, at all agents), and 3) UABS mobility (unique to UAVs). In some cases, cell biasing may be applied only at the SCBSs. Since the MBSs transmit at high power, and UABSs are capable of changing their position depending on the interference conditions, load balancing may be achieved with faster convergence due to the reduced action space.

In an example embodiment with a representative scenario such as in FIG. 7, the "players" in the Q-learning problem are defined as SCBS $p \in P$, MBS $m \in M$, and UABS $d \in D$. The resource units (RUs) where the UEs are scheduled can be CCs, subframes, beam directions, or resource blocks. Then, for a given UE, the state, action, and perceived cost associated with the Q-learning procedure at each player can be defined as follows:

The "state" of a player at time t in RU r is given by the vector states $s_{r,p}$, $s_{r,m}$, and $s_{r,d}$ for different players, each taking values from a finite number of states, representing, e.g., the link quality level at different players.

The "action" set for a SCBS p is $A_p=\{\beta_p, \alpha_{r,p}\}$, where $\beta_p$ is the set of range expansion bias values, and $\alpha_{r,p}$ is the set of transmit power levels at RU r. For an MBS m, $A_m=\{\alpha_{r,m}\}$, capturing the transmit power levels at RU r. Finally, for a UABS d, $A_d=\{\alpha_{r,d}, \psi_d\}$, where $\alpha_{r,d}$ is the set of transmit power levels at RU r, and d is the set of possible mobility actions (e.g., north, south, west, east, on a meshgrid).

The "cost" for RU r of SCBS p can be defined as $c_{r,p}=(\Gamma_{r,p}-\Gamma_{target})^2$, which forces the SINR $\Gamma_{r,p}$ of a given UE to a target SINR $\Gamma_{target}$. Similar costs can also be defined for the MBS m and the UABS d.

Given these player, state, action, and cost definitions, the Q-learning process allows the players to act and learn. Being in a state s after selecting action a, and receiving the immediate cost c, a BARN agent $n \in \{p, m, d\}$ updates its knowledge $Q_n(s, a)$ for the particular state-action pair through the following operation:

$$Q_{r,n}(s, a) \leftarrow (1-\alpha)Q_{r,n}(s, a) + \alpha\left[c_{r,n} + \lambda \min_a Q_{r,n}(s' a)\right]$$

where $\alpha$ (e.g., 0:5) is the player's willingness to learn from the BARN environment, $\lambda$(e.g., 0:9) is the discount factor, and s' is the next state [34, 35]. The agent's previous knowledge about the state-action pair (s, a) is represented by the first set of terms in the above equation, while the second set of terms represents the agent's learned value, which consists of the received cost $c_{r,n}$ after executing action a and the estimated minimum future cost $\min_a Q_{r,n}(s', a)$. Hence, Q-learning is an iterative procedure in which the previous knowledge $Q_{r,n}(s, a)$ is updated by considering the newly obtained knowledge represented by the cost value $c_{r,n}$ and the estimates of the future costs $\min_a Q_{r,n}(s', a)$.

In some embodiments, different types of UABS "players," such as gliders, quadcopters, and balloons, may be used in defining the particular Q-learning framework being implemented. For example, different UABS players can have different features and capabilities (e.g., beamforming capabilities, minimum/maximum possible UABS velocities, etc.). These features and capabilities can be incorporated into state and action definitions. In some cases, state and cost definitions that indicate other factors, such as throughput, outage, and energy efficiency, may also be incorporated to account for performance and stability trade-offs.

While it may be desirable to optimize a particular parameter in some cases, this may not be possible due to resource limitation or distributed control. Indeed, in wireless communications, it is often the case that one wants to satisfy a certain threshold quality of service (QoS) metric, rather than maximizing the QoS metric. For example, satisfying a minimum signal-to-interference-plus-noise ratio (SINR) or throughput can be sufficient for regular users in a PSC incident area, while the first responders may still want to maximize SINR or throughput for mission-critical QoS [43].

In some embodiments, alternative learning algorithms can be used to achieve interference management and load balancing in a BAHN. For example, satisfaction equilibrium techniques, which combine game theory with reinforcement learning, may be used in some cases. While Q-learning allows minimizing the total cost over time by trying different actions using a balanced exploration/exploitation mechanism, satisfaction-based learning keeps a given agent from updating its strategy as long as its performance metric is in a satisfactory range. Under some circumstances, this can yield a faster convergence behavior than conventional approaches such as Q-learning.

FIG. 9 shows example preliminary results for embodiments using Q-learning (QL) and satisfaction-based learning in a HetNet scenario. Time-domain ICIC is considered, where, similar to FIG. 7, agents can reduce their transmit power at a subset of subframes referred to as "almost blank" subframes (ABSs) [40]. Results show that both learning approaches can significantly improve the network-wide median UE throughput compared to fixed cell range expansion (CRE), especially for large values of ABS power reduction.

In some embodiments, Bayesian reinforcement learning algorithms for BAHN interference management and load balancing may achieve faster convergence. Bayesian approaches maintain a prior distribution over unknown parameters, while learning is achieved by computing a posterior distribution based on the observed data [45-47]. This may enable the domain knowledge being incorporated into prior distribution for faster learning, optimization of the exploration/exploitation tradeoff, and development of robust policies that take notions of risk into account.

Some embodiments of the subject invention include techniques and systems for self-organizing mobility management for BAHN environments.

Generally, mobility management (MM) is the communications network capability by which a UE seamlessly transfers its connectivity from one serving BS to another. MM is mainly concerned with the problem of when to handover which UEs to which BSs in light of metrics such as network connectivity and throughput. The major goal of an MM activity is to achieve mobility-robustness by minimizing handover failures. If a handover is triggered prematurely, the signal strength at the new BS may be too low to maintain connectivity, resulting in a handover failure and a dropped call. Another consequence of a premature handover is the prospect of an immediate successive handover back to the originating BS, which can be caused by channel fading effects or high UE velocities. This process, commonly referred as "ping-pong," may introduce network signaling overhead and severe QoS degradation due to lost packets during handovers. On the other hand, if a handover is triggered too late, the interference from a candidate BS becomes too high before completing the handover—again causing a handover failure.

Although handover is a well-known problem in cellular networks and HetNets, the mobility of the infrastructure coupled with the mission-critical QoS requirements of PSC scenarios imply that incremental changes to existing MM mechanisms will not be sufficient for managing handovers in BAHNs. Therefore, needed are model adjustment capabilities and novel reinforcement learning techniques to simultaneously achieve network-wide mobility-robustness and broadband throughput in BAHN PSC scenarios.

Mobility management technologies typically use the following parameters at a UE to control the handover process: 1) a hysteresis margin, which is a typically positive bias added to the serving BS's received power; 2) a range expansion bias, typically added only to an SCBS's received power; and 3) a time-to-trigger timer, which delays the handover initiation to mitigate early/late handovers and ping-pongs.

Figure 10:
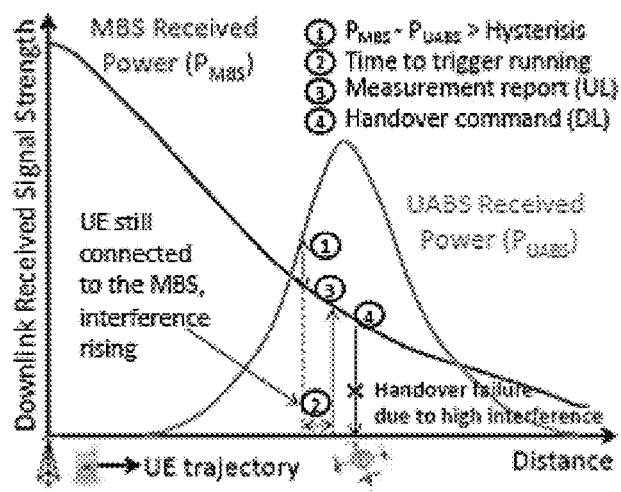
FIG. 10 shows an example of stages in a handover process.
Figure 11:
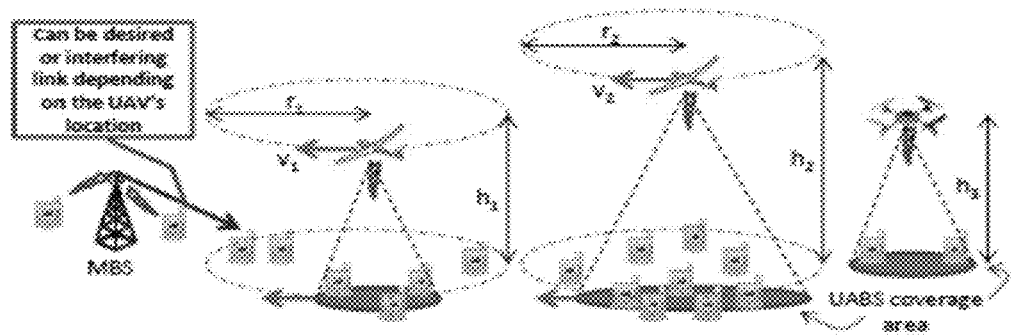
FIG. 11 shows a BAHN scenario with gliders circulating around a hot spot area.

In conventional homogeneous cellular networks with only macrocells, all the UEs typically use the same set of MM parameters throughout the network. In BAHNs, on the other hand, due to small cell sizes [48, 49], and the mobility of the network infrastructure, using the same set of MM parameters for all cells and/or for all UEs can degrade handover performance. One illustrative example is shown in FIG. 10, where the four key steps needed to complete a handover process at a UE are specified. For a high-mobility UE, the distance traveled during the period of the time-to-trigger will be large. As shown in FIG. 10, when moving through a small cell such as a UABS, the interference level at the UE may rise quickly before finalizing a handover, therefore resulting in a handover failure. In BAHN scenarios, as exemplified in FIG. 11, gliders may have to circulate around hot spot areas to provide broadband connectivity. In another example, UAVs traveling into an incident scene may keep their radio on for serving the UEs along their trajectory. Such a dynamic mobile network infrastructure introduces severe MM challenges in BAHNs.

In order to address the MM challenges in BAHNs, embodiments of the subject invention include techniques for reducing handover failures and ping-pong probability. Such techniques may be implemented as an aspect of BAHN controller components.

Figure 12:
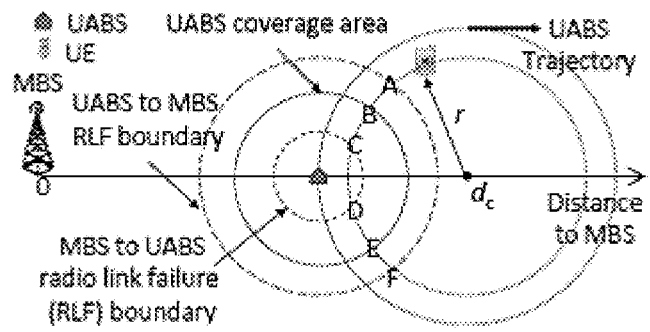
FIG. 12 shows a simplified geometric model involving mobile UABSs with one MBS and one glider.

FIG. 12 shows a simplified geometric model involving mobile UABSs with one MBS and one glider, circulating clockwise around a center located at a distance $d_c$ from the MBS. A stationary UE far away from the MBS and at distance r from the circulation center of the UABS is also shown. The UABS coverage area denotes the boundary where a time-to-trigger gets initiated at a UE, which delays a potential handover between the UABS and the MBS. In FIG. 12, the UE connected to the MBS should finalize its handover through the arc $\widehat{BC}$ and before it meets the MBS-to-UABS RLF boundary, where the interference from the UABS becomes too high and results in a handover failure. Similarly, a UE connected to the UABS should finalize its handover to the MBS before reaching the UABS-to-MBS RLF boundary (through the arc $\widehat{EF}$).

Handover failure and ping-pong probability for such scenarios will depend at least partly on UABS velocity, particular MBS/UABS/UAV geometry, and current MM parameters. To optimize the candidate model to minimize handover failure and ping-pong probability, MM techniques can adjust certain factors. In some cases, these adjustments may be part of a candidate model that seeks to optimize other factors, such as interference.

In some cases, an adjustment may be made to the three-dimensional location and/or velocity of one or more UABSs. Another type of model adjustment is modifying an MM parameter at selected user equipment. For example, the hysteresis margin, range expansion bias, and time-to-trigger timer may be modified, tuned, or adjusted at any selected individual UE or group of UEs.

Sometimes, an adjustment can include modifying an operating state of features on a UABS. For example, maximizing coverage and minimizing handover failures may be two conflicting design goals. On the one hand, to maximize their coverage radius on earth, UABSs with omni-directional antennas can move to an optimized height. However, large, overlapping, and dynamically varying coverage areas among different UABSs may also accentuate handover failure and ping-pong problems. In some embodiments, planar antenna arrays may be installed on some UABSs, and a model adjustment can be made to enable 3D beamforming features for constraining the coverage area.

In some cases, a candidate BAHN model can include certain simplifying assumptions, such as those described in [50, 51]. Furthermore, because factors may have conflicting optimizations in some cases, a model adjustment may be made which produces a satisfactory, rather than optimal, model.

In some cases, the MM capabilities must operate in a distributed fashion, for example when state data is not fully shared between BSs. In some embodiments, a reinforcement learning component may be trained so that a BS device can determine an autonomous adjustment for minimizing handover failures while maintaining high network throughput. A reinforcement learning component trained for MM may also be trained for interference management, as previously described, though the action and state space become larger due to simultaneously considering processing MM metrics and throughput. Therefore, techniques with a fast convergence time may be useful.

In certain embodiments, a multi-armed bandit (MAB) technique may be used. The MAB is a machine-learning technique analogous to the traditional "one-armed bandit" slot machine [29]. When pulled, each machine/agent provides a reward, and the objective is to maximize the collected rewards through iterative pulls, i.e., learning iterations. An agent selects its actions based on a utility function reflecting the well-known exploration-exploitation trade-off in learning algorithms. While the rate of convergence of MAB can be bounded, this comes at the expense of suboptimal performance.

A preliminary representative MAB framework can be defined by extending the player, state, and action definitions discussed with respect to Q-learning. Again considering a scenario as in FIG. 7, players are defined as the MBS, SCBS, and the UABS, the actions can be extended to include hysteresis and time-to-trigger configurations, and states will be extended through UE and UABS velocities. In addition, a utility function is defined that is composed of an exploitation term and an exploration term, which captures the number of times a particular action combination has been selected in the past. In a learning iteration, the action that maximizes the defined utility function is selected. The number of times that each action is executed and its corresponding outcomes are logged; these metrics are reflected back into the utility function for choosing future actions.

Figure 13:
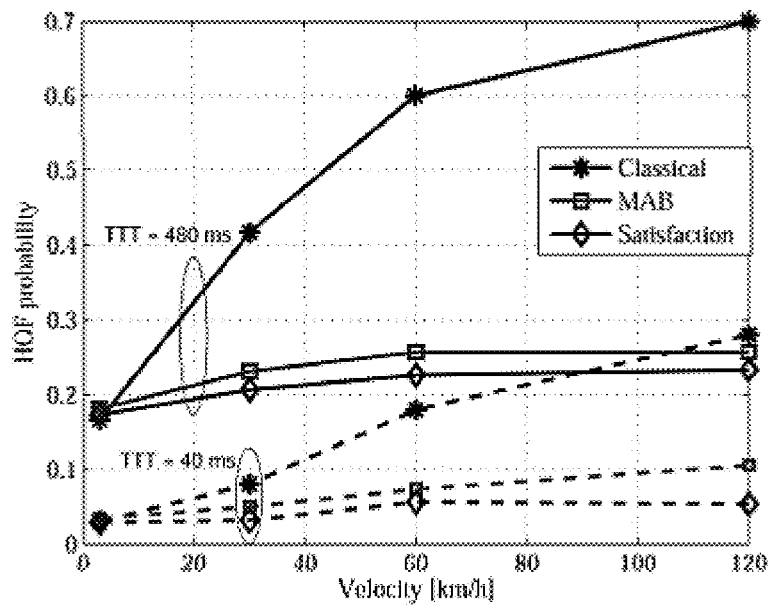
FIG. 13 shows experimental results comparing reinforcement learning techniques in HetNet scenarios without UABSs.

To illustrate the potential effectiveness of reinforcement learning approaches, FIG. 13 shows experimental results for conventional HetNet scenarios (without UABSs) from [52]. This figure shows the handover failure (HOF) probability as a function of UE velocity, assumed identical for all UEs in the network. The HOF probabilities of the classical (no learning), MAB-based, and satisfaction-based learning methods are plotted for two typical time-to-trigger (TTT) values: 40 ms and 480 ms. Compared to the classical MM approach, the learning-based methods are shown to yield lower HOF probabilities, especially at higher UE velocities. Further results in [52] also show significant throughput gains through learning algorithms, achieved simultaneously with the MM gains.

In some embodiments, combinatorial MAB techniques may be employed for reinforcement learning, where simple arms with unknown distributions form super arms [53, 54]. In each round of the learning mechanism, a super arm is "played", followed by the observation of the outcomes corresponding to the simple arms [53]. The main motivation of such combinatorial MAB techniques is that they facilitate the selection of super arms in future iterations, hence requiring a smaller number of iterations for achieving a particular regret feedback.

To further improve convergence speed, in some embodiments Bayesian MAB techniques may be employed for reinforcement learning [55]. Bayesian MAB techniques allocate observations to arms in a random fashion, relying on a Bayesian posterior probability that each arm is optimal.

An additional learning approach that may be used in some cases is active learning, wherein the agents in a BAHN PSC environment learn the action space on the fly in order to better optimize their utility functions with less training [56]. Dual learning, where an agent simultaneously carries out learning and estimates a cost function [57], and non-parametric reinforcement learning, where the agents dynamically adopt different strategies such as Q-learning and MAB depending on the environment [58], may also be used.

Certain embodiments of the subject invention include a UABS apparatus having an unmanned aerial vehicle (UAV), communications interface for communicating with a HetNet in accordance with wireless air interface standards, and a device executing program instructions for BAHN control or reinforcement learning components. A UABS apparatus may formulated, e.g., from a UAV device fitted with a device/system described with respect to FIG. 14. An example UABS embodiment is described in the examples section.

The term "unmanned aerial vehicle" refers to an autonomous or semi-autonomous vehicle that is capable of performing some functions without a physically-present human pilot. Examples of flight-related functions may include, but are not limited to, sensing its environment or operating in the air without a need for input from an operator, among others.

A UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Further, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" (UAVS), or "unmanned aerial system" (UAS) may also be used to refer to a UAV.

In certain embodiments, a UABS apparatus may be configured to decode random access channel (RACH) signals/messages to assist in locating victims. A RACH signal is a signal that UEs may use to initialize attachment or synchronization with a wireless network (e.g., LTE). Even though sufficient network capability may not exist for the UEs to attach to the network, make calls, or use broadband, the RACHs may serve as beacons from UE devices that can be located by UABS flying overhead.

For example, following an emergency incident such as an earthquake, large volumes of call attempts will occur, which then initiates RACH messages transmitted from a UE to a BS. In scenarios with damaged BS infrastructure, the distance between UEs and BSs may be very large. Since a BS will have to simultaneously serve large number of UEs, identical RACH preamble transmissions from different UEs may collide, resulting in outage problems. A flying UAV such as a glider may capture RACH transmissions and provide a real time heat-map of UE density over an incident area. This information can then be sent to a central command center, or controlling BS, for determining a candidate BAHN model and making model adjustments such as routing UABSs into congested areas. In some cases, RACH messages may be used by a receiving UABS to determine an autonomous model adjustment using a reinforcement learning component.

Figure 14:
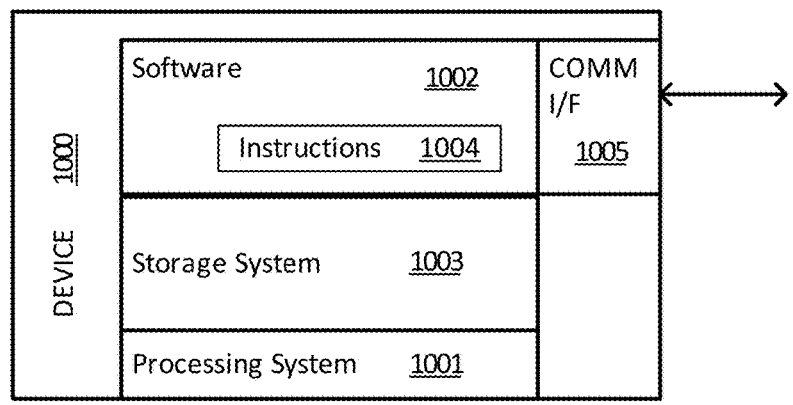
FIG. 14 shows a block diagram illustrating components of a computing device or system used in some implementations of techniques and systems for managing interference and handover in a BAHN.

FIG. 14 shows a block diagram illustrating components of a computing device or system used in some implementations of techniques and systems for managing interference and handover in a BAHN. For example, any component of the system, including a BAHN control component (e.g., presented on a UABS or controlling node of a network zone) or reinforcement learning component, may be implemented as described with respect to device 1000. Device 1000 can itself include one or more computing devices. The hardware can be configured according to any suitable computer architectures such as a Symmetric Multi-Processing (SMP) architecture or a Non-Uniform Memory Access (NUMA) architecture.

The device 1000 can include a processing system 1001, which may include a processing device such as a central processing unit (CPU) or microprocessor and other circuitry that retrieves and executes software 1002 from storage system 1003. Processing system 1001 may be implemented within a single processing device but may also be distributed across multiple processing devices or sub-systems that cooperate in executing program instructions.

Examples of processing system 1001 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system 1003 may comprise any computer readable storage media readable by processing system 1001 and capable of storing software 1002 including, e.g., processing instructions for managing interference and handover in a BAHN. Storage system 1003 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, optical disks, CDs, DVDs, flash memory, solid state memory, phase change memory, 3D-XPoint memory, or any other suitable storage media. Certain implementations may involve either or both virtual memory and non-virtual memory. In no case do storage media consist of a transitory, propagated signal. In addition to storage media, in some implementations, storage system 1003 may also include communication media over which software 1002 may be communicated internally or externally.

Storage system 1003 may be implemented as a single storage device but may also be implemented across multiple storage devices or sub-systems co-located or distributed relative to each other. Storage system 1003 may include additional elements capable of communicating with processing system 1001.

Software 1002 may be implemented in program instructions and, among other functions, may, when executed by device 1000 in general or processing system 1001 in particular, direct device 1000 or processing system 1001 to operate as described herein for managing interference and handover in a BAHN. Software 1002 may provide program instructions 1004 that implement components for managing interference and handover in a BAHN. Software 1002 may implement on device 1000 components, programs, agents, or layers that implement in machine-readable processing instructions 1004 the methods and techniques described herein.

In general, software 1002 may, when loaded into processing system 1001 and executed, transform device 1000 overall from a general-purpose computing system into a special-purpose computing system customized to manage interference and handover in a BAHN in accordance with the techniques herein. Indeed, encoding software 1002 on storage system 1003 may transform the physical structure of storage system 1003. The specific transformation of the physical structure may depend on various factors in different implementations of this description. Examples of such factors may include, but are not limited to, the technology used to implement the storage media of storage system 1003 and whether the computer-storage media are characterized as primary or secondary storage. Software 1002 may also include firmware or some other form of machine-readable processing instructions executable by processing system 1001. Software 1002 may also include additional processes, programs, or components, such as operating system software and other application software.

Device 1000 may represent any computing system on which software 1002 may be staged and from where software 1002 may be distributed, transported, downloaded, or otherwise provided to yet another computing system for deployment and execution, or yet additional distribution. Device 1000 may also represent other computing systems that may form a necessary or optional part of an operating environment for the disclosed techniques and systems.

A communication interface 1005 may be included, providing communication connections and devices that allow for communication between device 1000 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

It should be noted that many elements of device 1000 may be included in a system-on-a-chip (SoC) device. These elements may include, but are not limited to, the processing system 1001, a communications interface 1005, and even elements of the storage system 1003 and software 1002.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Following are examples that illustrate procedures for practicing certain disclosed techniques and/or implementing disclosed systems. Examples may also illustrate advantages, including technical effects, of the disclosed techniques and systems. These examples should not be construed as limiting.

A testing platform for deriving experimental results may serve as an example embodiment of systems or apparatuses of the subject invention. A testing platform may include a multiplicity of types of UAV (e.g., a DCI Phantom 2 quadcopter) used to carry computing devices (e.g., a Raspberry Pi devices) and software-defined radio (SDR) devices of various capabilities that act as LTE senders/receivers.

For example, SDR devices can include devices such as USRPs. The USRP X310 is an SDR device capable of wideband (up to 120 MHz) communications and channel sounding; it can be configured as an LTE base station that communicates with the flying UAVs. The USRP E300 is a GPS-capable and embedded device that is lightweight enough to be carried by the UAVs. This will allow direct communication and data logging (with time and 3D location stamps) capabilities at flying UAVs. To implement LTE at USRPs, evolutions of the open source software such as OpenLTE can be utilized.

The RTL-SDR is a flexible and inexpensive SDR receiver which can be coupled with the Raspberry Pi devices for wireless data logging purposes, and which can be carried by most kinds of UAVs. The RTL-SDR and Raspberry Pi pairs can be programmed using software such as LabVIEW and GNU Radio. Smaller, Wi-Fi-controlled UAVs with no payload capabilities may also be utilized for channel sounding purposes. In particular, their Wi-Fi preamble, composed of an 11-bit Barker sequence, can be sniffed through USRPs and then used for channel sounding. The Raspberry Pi device attached to the UAV is a capable computing device (see FIG. 15) that can host a reinforcement learning component and/or BAHN interference management and handover component as described herein. In some cases, a control module can be integrated for moving or controlling various capabilities of the UAV.

A small-scale BAHN experimentation platform can be constructed from such embodiments, where one LTE BS serving to multiple users will be assisted with two UAVs, each carrying a USRP E300. Using these experiments, the impact of UAV mobility and ICIC techniques on throughput and outage can be investigated. In some cases, reinforcement learning components and techniques can be integrated into the UAV-SDR bundle platform for self-optimization of UAV location, height, and mICIC parameters.

An experimentation platform as described above may provide all or part of an implementation that illustrates the advantages of the subject invention for public safety communications scenarios.

In a large scale PSC scenario such as the one illustrated in FIG. 1, an experimental assumption can be that MBS locations are randomly distributed according to a Poisson point process (PPP). Monte Carlo simulations can be performed to evaluate capacity and throughput coverage of the network. In the experiment, some base station nodes are randomly removed to imitate a natural disaster. The potential benefits of UAVs in the post-disaster scenario can be measured by studying the capacity and coverage improvements achieved through the deployment of UAVs. Furthermore, the locations of the UAVs can be optimized to maximize the 5th percentile capacity of the network.

In particular, the PSC includes a cellular network with MBS and UE locations modeled as two-dimensional homogeneous PPPs of intensities $\lambda$ and $\lambda_u$, respectively. PPP-based models may not be viable for capturing real MBS locations, due to some points of the process being very close to each other. However, the PPP-based models provide reasonably close performance results when compared with the real BS deployments. A further assumption is that all the MBSs transmit at power $P_{tx}$, and every UE connects to its nearest MBS. For an arbitrary UE n at a distance $r_{nm}$ from its serving MBS m, the average received signal power is given by $$S(r_{nm}) = \frac{P_{tx} K}{r_{nm}^\delta}, \qquad (1)$$

where $\delta$ is the path-loss exponent (PLE), and K is the factor that accounts for the geometrical parameters such as transmitter and receiver antenna heights, etc. Further, an interference limited network is assumed, in which the thermal noise power at a receiver is negligible when compared to the interference power. Then, the SIR at UE n can be expressed as, $$\Gamma_n = \frac{S(r_{nm})}{\sum_{i \in M, i \neq m} S(r_{ni})}, \qquad (2)$$

where M is the set of all MBSs, and $r_{ni}$ is the distance of n-th UE to the i-th MBS. The denominator in (2) represents the total interference power at a UE from all the MBSs except the serving MBS m. Using Shannon capacity formula, and considering round-robin scheduling for simplicity, the spectral efficiency (SE) of a macrocell UE (MUE) can be expressed as, $$C_n = \frac{\log_2(1 + \Gamma_n)}{N}, \qquad (3)$$

where N is the number of MUEs in the macrocell.

Figure 15:
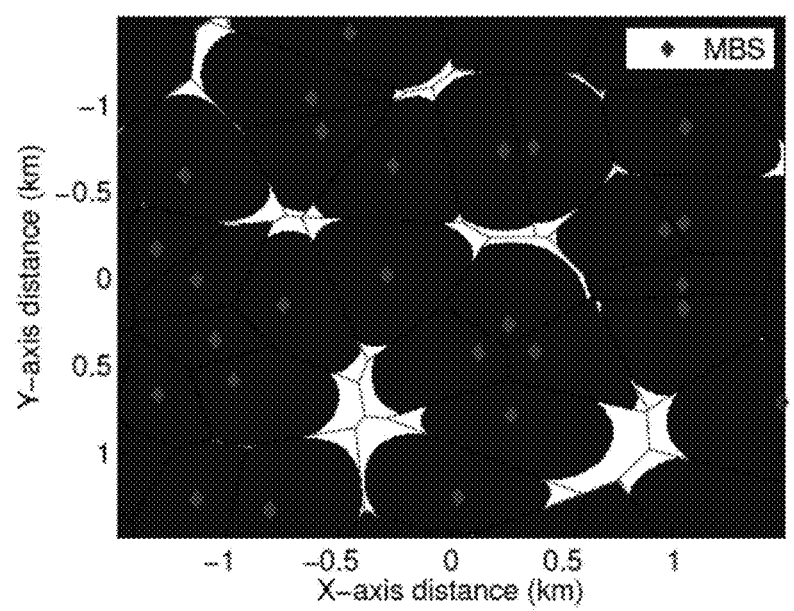
FIG. 15 shows an example coverage map of a heterogeneous network (HetNet) region in normal operating conditions.
Figure 16:
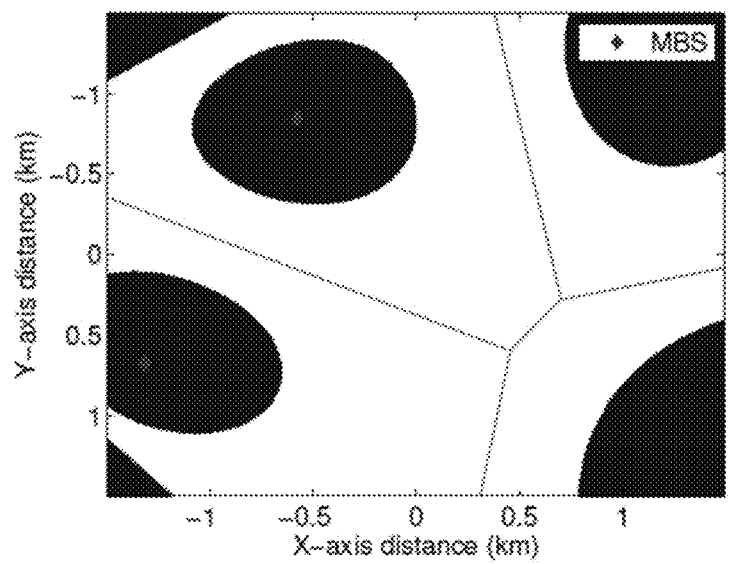
FIG. 16 shows an example coverage map of a cellular network after an earthquake, wherein 90% of the MBSs are randomly destroyed.

Since achieving broadband rates is a major goal, a UE is considered to be in throughput coverage if its average throughput per unit bandwidth is higher than a threshold $T_C$, i.e., $C > T_C$. Full buffer traffic is assumed in all the downlinks. A sample network layout with MBS intensity $\lambda=4$ per km² is illustrated in FIG. 16 for a 3×3 km² region. In FIG. 15, the black lines indicate the cell boundaries, while the darker-colored areas correspond to the throughput coverage areas in which the UEs' throughput are greater than the threshold $T_C=3.5\times10^{-3}$ bps/Hz, assuming a UE intensity of $\lambda_u=400$ per km². The white colored regions, on the other hand, are areas where the user throughput is lower than the threshold $T_C$, which is negligible in FIG. 15.

To illustrate the impact of infrastructure loss on coverage and throughput, an example scenario of the cellular network after an earthquake is shown in FIG. 16, where 90% of the MBSs are randomly destroyed during a disaster. The same throughput threshold $T_C$ as in FIG. 15 is used to calculate outage regions. In this second scenario, the outage region grows significantly, due to overloading of MBSs with many UEs and poor link quality of UEs far away from the MBSs. In a PSC scenario, first responders and victim users located within a white region in FIG. 16 will observe very low throughput, or even a complete outage and loss of connectivity. Naturally, for higher throughput thresholds, the outage region will grow even larger.

In the scenario of loss in network infrastructure as in FIG. 16, UABSs can be deployed rapidly to form small cells and consequently improve the network coverage. Unlike MBSs, the UABSs' positions can be dynamically adjusted and therefore their physical locations can be optimized in order to get the best network performance for a given scenario. With the deployment of UABSs, a HetNet is formed with two tiers of BSs: MBSs and UABSs. For simplicity, several experimental assumptions can be made. First, both the MBSs and the UABSs share a common transmission bandwidth. Second, the wireless backhaul links of the UABSs have very large capacity, and they use a different frequency band than the access links.

For an arbitrary UE n, let the nearest MBS m at a distance $r_{nm}$ be its MBS of interest (MOI) and the nearest UABS u at a distance $r_{nm}$ be its UABS of interest (UOI). Then, the average received signal power from the MOI and the UOI are respectively given by $$S(r_{nm}) = \frac{P_{tx}K}{r_{nm}^\delta}, \quad S'(r_{nu}) = \frac{P'_{tx}K'}{r_{nu}^\delta}, \quad (4)$$

where $P_{tx}'$ is the transmit power of UABSs, and K' is the factor that accounts for the geometrical parameters such as the transmitter and receiver antenna heights. Then, an arbitrary UE experiences the SIRs, $$\Gamma_n = \frac{S(r_{nm})}{\Sigma_{i\in\mathcal{M},i\neq m}S(r_{ni}) + \Sigma_{j\in\mathcal{U}}S'(r_{nj})}, \quad (5)$$

$$\Gamma'_n = \frac{S'(r_{nu})}{\Sigma_{i\in\mathcal{M}}S(r_{ni}) + \Sigma_{j\in\mathcal{U},j\neq u}S'(r_{nj})}, \quad (6)$$

from the MOI and the UOI, respectively. Here, u is the set of all UABSs, and $r_{nj}$ is the distance of nth UE to the jth UABS. The denominators of Equations (5) and (6) represent the total interference power at the UE. An assumption is that the UABSs employ range expansion bias (REB) during the UE association process in order to associate with a greater number of UEs. Each UE performs cell selection by using $\Gamma_n$, $\Gamma_n'$, and the REB τ as follows:

If $\Gamma_n > \tau\Gamma_n' \rightarrow$ select MOI (7)

If $\Gamma_n \leq \tau\Gamma_n' \rightarrow$ select UOI (8)

Finally, the SEs of MUE and UABS-cell UE (UUE) can be respectively expressed as, $$C_n = \frac{\log_2(1+\Gamma_n)}{N}, \quad C'_n = \frac{\log_2(1+\Gamma'_n)}{N'}, \quad (9)$$

where N' is the number of UUEs in the UABS-cell.

Figure 17:
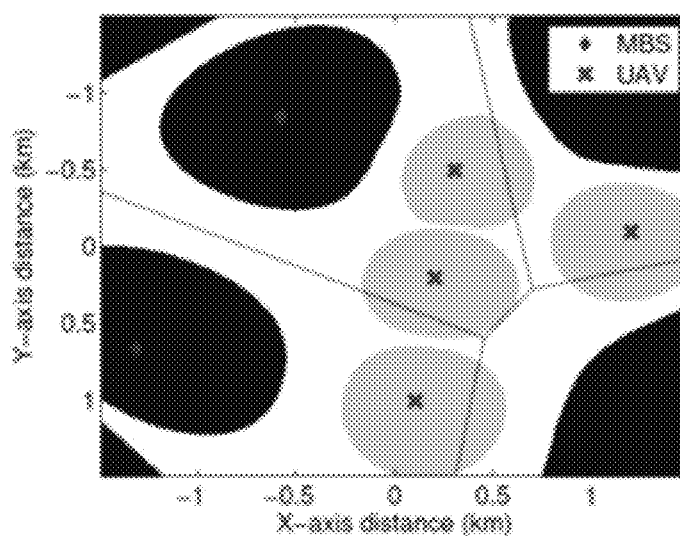
FIG. 17 shows an optimized placement of four UABSs maximizing the 5th percentile throughput over the whole network.

FIG. 17 shows an optimized placement (through brute force search) of four UABSs, in a way to maximize the 5th percentile throughput over the whole network. Each UABS is assumed to know the locations of other UABSs and BSs. The UABSs are observed to be clustered around the cell edges in order to take over the low-SIR UEs in an effort to maximize 5th percentile rate. In the considered architecture, it is assumed that UABSs can communicate through a backhaul link to a nearby BS node.

The ability of UABSs to move to any location and height on an incident area provides a powerful mechanism to maintain high throughput coverage throughout the network. To illustrate potential gains that can be obtained, the experimental results show how an optimized deployment of UABSs can improve the network throughput for the scenario of FIG. 17. Unless otherwise specified, the system parameters for the simulations are set to the values as shown in Table I, and the locations of all UABSs are optimized through brute force search to maximize 5th percentile spectral efficiency of the network.

TABLE I

SYSTEM PARAMETERS

| Parameter | Description | Value |
|---|---|---|
| $\lambda, \lambda_u$ | MBS and UE intensities | 4, 100 |
| $P_{tx}, P_{tx}'$ (in dBm) | MBS and UABS transmit powers | 46 dBm, 30 dBm |
| K, K' (in dB) | Factors accounting for the geometrical parameters of antennas | −11 dB, −11 dB |
| δ | Path-loss exponent | 4 |
| τ | Range expansion bias | 0 dB |
| $d_h$ | Altitude of UABSs | 400 feet |
| $T_C$ | Throughput coverage threshold | 2.55 × 10⁻³ bps/Hz |
| $A_{sim}$ | Simulation area | 10 × 10 km² |

Brute force search is used in this experiment for simplicity, but other optimization techniques can also be used for efficient implementation, as described in other embodiments described herein. Here, the simulation area was divided into a grid, with horizontal and vertical distances of 0.5 km between the vertices. The 5th percentile SE was evaluated by placing the UABS at every vertex, and the vertex location that maximizes the 5th percentile SE was chosen as the optimum location for DABS.

Figure 18A:
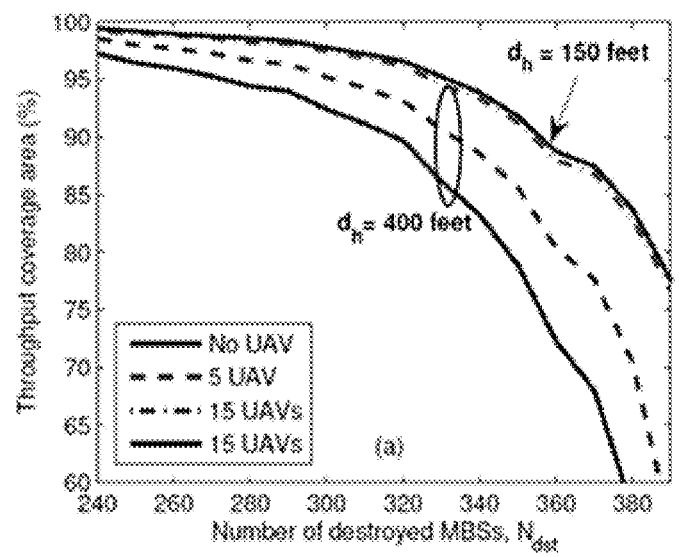
FIGS. 18A-18B show the throughput coverage area and the 5th percentile SE as a function of the number of destroyed MBSs $N_{dst}$.
Figure 18B:
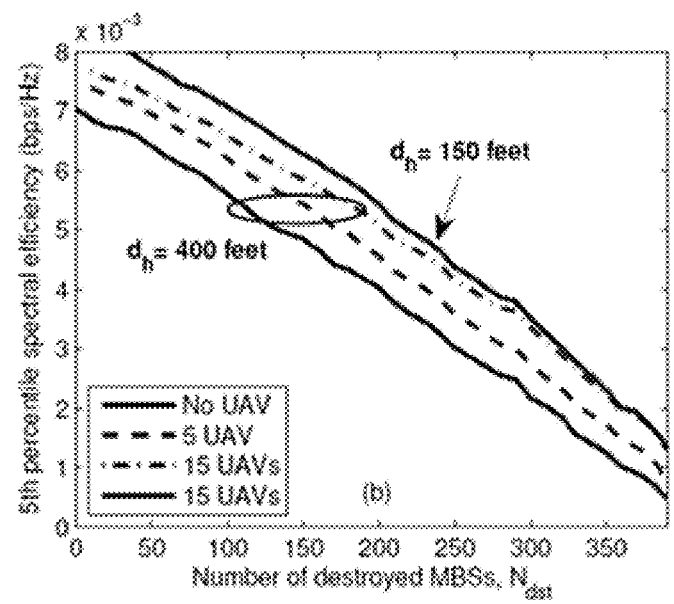

FIGS. 18A-18B show the throughput coverage area (FIG. 18A) and the 5th percentile SE (FIG. 18B) as a function of the number of destroyed MBSs $N_{dst}$ (out of a total 400) with varying numbers of helper UABSs. The throughput coverage area is defined as the percentage of area with throughput larger than a threshold $T_C$ (taken as 2.55×10−3 bps/Hz in simulations), versus the whole simulation area. These results suggest that the height ($d_h$) of a UABS, isolated from other model adjustments that may be made, has a relatively limited effect on throughput coverage, but has a more pronounced effect on the 5th percentile throughput due to path loss factors. FIG. 18A also shows that 15 optimally-positioned UABSs can handle the load of up to 70 MBSs from a throughput coverage area perspective, while the gains are lower when the 5th percentile SE is considered. Lowering the UABS height (assuming line-of-sight scenarios) is also shown to bring additional SE benefits due to lower path loss.

Figure 19A:
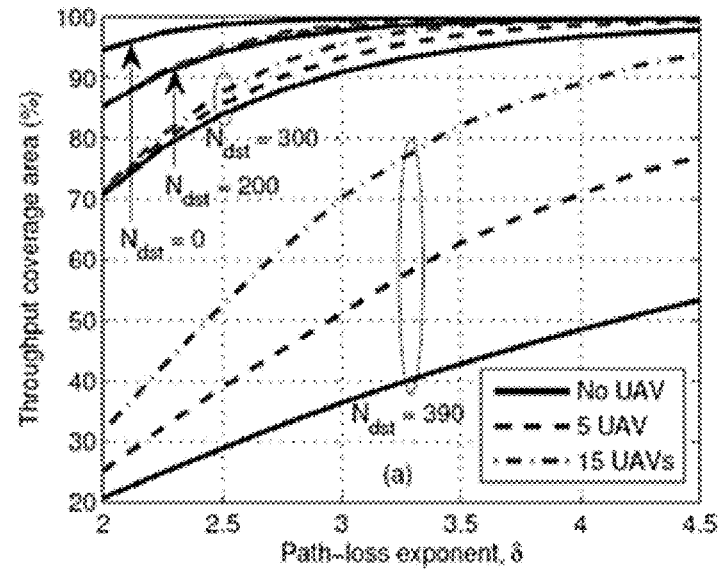
FIGS. 19A-19B show the characteristics of throughput coverage and $5^{th}$ percentile SE with respect to variations in the PLE.
Figure 19B:
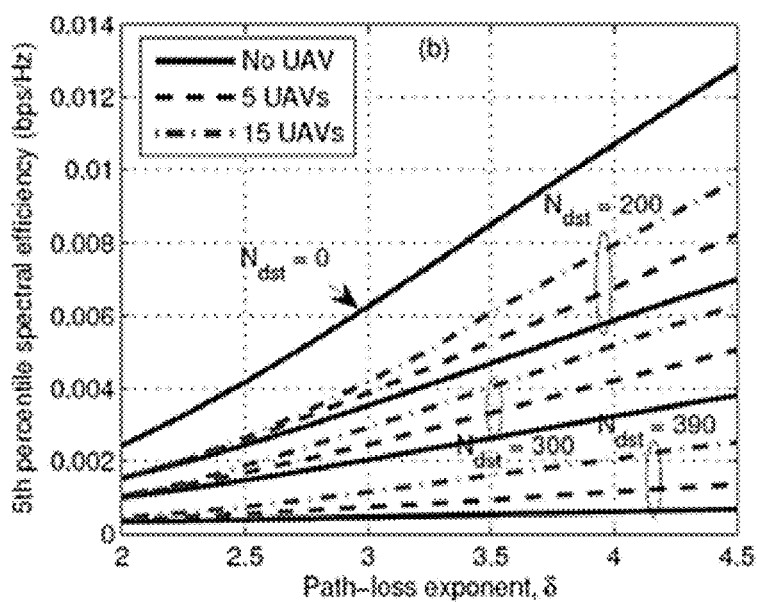

FIGS. 19A-19B show the characteristics of throughput coverage (FIG. 19A) and $5^{th}$ percentile SE (FIG. 19B) with respect to variations in the PLE. In general, both the throughput coverage and the 5th percentile SE improve with the increasing PLE because the interference power at a UE decreases more rapidly than the signal power as the PLE increases, thereby improving the SIR at the UE. This may be due to the fact that the UE's distance to its connected BS is lesser than all other interfering BSs. FIG. 19A also shows that the throughput coverage improves with a greater number of UABSs, and the improvement is significant with higher PLE. For example, in a disaster scenario where 390 out of 400 MBSs are destroyed, approximately 94% of the area can still be covered with just 15 UABSs, provided the PLE is 4.5.

Figure 20A:
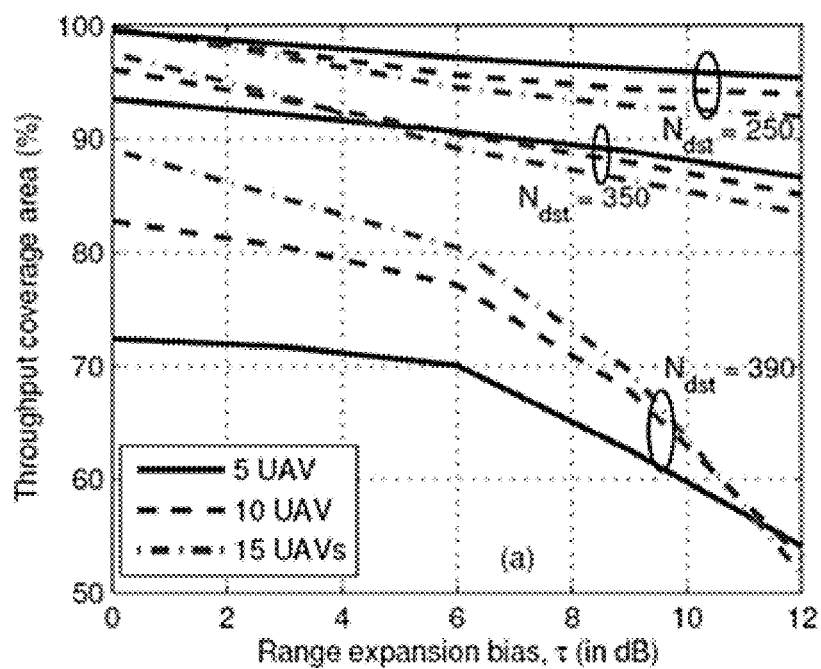
FIGS. 20A-20B show the variations of throughput coverage area and 5th percentile SE with respect to the REB.
Figure 20B:
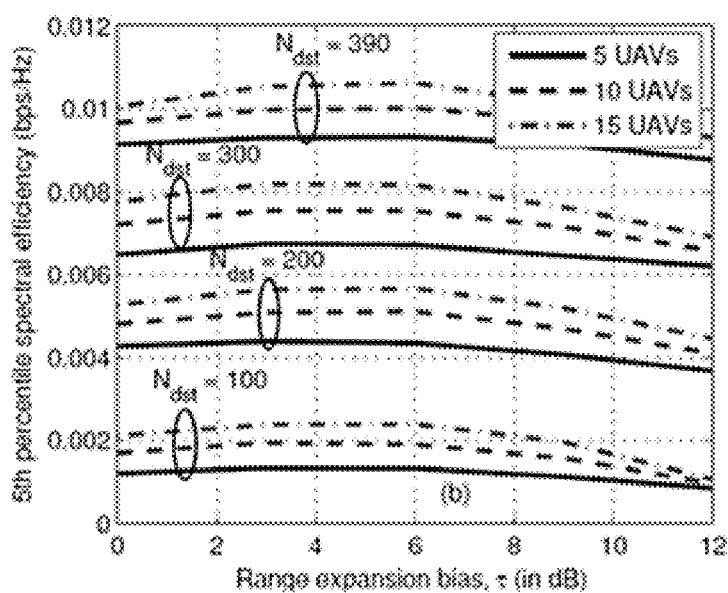

FIGS. 20A-20B show the variations of throughput coverage area (FIG. 20A) and 5th percentile SE (FIG. 20B) with respect to the REB. It can be observed from the figure that the throughput coverage area degrades with increasing REB. As the REB increases, the UABSs can associate with a greater number of UEs. With the increasing number of UEs in the cell, the average throughput of each user decreases due to the limited spectrum bandwidth available to share among all the UEs in the cell. This causes the throughput coverage area of UABSs to decrease as the REB increases. On the other hand, the effect of REB on the 5th percentile SE is limited.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] FCC, "National broadband plan—ch. 16: Public safety," March 2010. [Online]. Available: http://www.broadband.gov/plan/16-public-safety/[2] "Aerial base stations with opportunistic links for unexpected and temporary events." [Online]. Available: http://www.absolute-project.eu/

[3] T. Q. S. Quek, G. de la Roche, I. Guvenc, and M. Kountouris (Editors), Small Cell Networks: Deployment, PHY Techniques, and Resource Management. Cambridge University Press, February 2013.

[4] D. L'opez-P'erez, I. Guvenc, G. Roche, M. Kountouris, T. Q. Quek, and J. Zhang, "Enhanced intercell interference coordination challenges in heterogeneous networks," IEEE Wireless Commun. Mag., vol. 18, no. 3, pp. 22-31, June 2011.

[5] I. Guvenc, F. Gunnarsson, and D. Lopez-Perez, Dynamic Interference Management.
Cambridge, UK: Cambridge University Press, 2013, ch. 7, pp. 1-25.

[6] Y. Sui, J. Vihriala, A. Papadogiannis, M. Sternad, W. Yang, and T. Svensson, "Moving cells: a promising solution to boost performance for vehicular users," Communications Magazine, IEEE, vol. 51, no. 6, 2013.

[7] C. Yangyang and X. Lagrange, "Downlink capacity gain analysis of mobile relay in lte-advanced network," in Proc. IEEE Consumer Communications & Networking Conference (CCNC), 2014.

[8] Y. Sui, Z. Ren, W. Sun, T. Svensson, and P. Fertl, "Performance study of fixed and moving relays for vehicular users with multi-cell handover under co-channel interference," in Proc. IEEE Int. Conf. Connected Vehicles and Expo (ICCVE), 2013, pp. 514-520.

[9] A. Osseiran, V. Braun, T. Hidekazu, P. Marsch, H. Schotten, H. Tullberg, M. A. Uusitalo, and M. Schellman, "The foundation of the mobile and wireless communications system for 2020 and beyond: Challenges, enablers and technology solutions," in Proc. IEEE Vehicular Technology Conference (VTC Spring), 2013, pp. 1-5.

[10] S. Rohde, M. Putzke, and C. Wietfeld, "Ad hoc self-healing of OFDMA networks using UAV-based relays," Ad Hoc Networks, vol. 11, no. 7, pp. 1893-1906, 2013.

[11] E. Yanmaz, S. Hayat, J. Scherer, and C. Bettstetter, "Experimental performance analysis of two-hop aerial 802.11 networks," in Proc. IEEE Wireless Commun. and Net. Conf, 2014.

[12] A. Merwaday, S. Mukherjee, and I. Guvenc, "HetNet capacity with reduced power subframes," in Proc. IEEE Wireless Commun. Networking Conf. (WCNC), Istanbul, Turkey, April 2014.

[13] A. Merwaday, S. Mukherjee, and I. Guvenc, "Capacity analysis of LTE-Advanced HetNets with reduced power subframes and range expansion," submitted to EURASIP J. Wireless Commun. Networking, 2014. [Online]. Available: http://arxiv.org/pdf/1403.7802v1.pdf

[14] G. Yuan, X. Zhang, W. Wang, and Y. Yang, "Carrier aggregation for lte-advanced mobile communication systems," Communications Magazine, IEEE, vol. 48, no. 2, pp. 88-93, 2010.

[15] K. I. Pedersen, F. Frederiksen, C. Rosa, H. Nguyen, L. G. U. Garcia, and Y. Wang, "Carrier aggregation for lte-advanced: functionality and performance aspects," Communications Magazine, IEEE, vol. 49, no. 6, pp. 89-95, 2011.

[16] R. Rotondo, "The potential for unlicensed spectrum: Can cognitive radio help mission-critical users take advantage of unlicensed spectrum opportunities?" XG TEchnology White Paper, August 2011. [Online]. Available: http://www.xgtechnology.com/MissionCritical Article August 2011 final.pdf

[17] Qualcomm, "Extending LTE Advanced to unlicensed spectrum," December 2013. [Online]. Available: http://www.qualcomm.com/media/documents/files/ white-paper-extending-lte-advanced-to-unlicensed-spectrum.pdf

[18] 3GPP Workshop on LTE in Unlicensed Spectrum, June 2014. [Online]. Available: http://www.3gpp.org/news-events/3gpp-news/1603-lte in unlicensed

[19] A. Cavalcante, E. Almeida, R. Vieira, F. Chaves, R. Paiva, F. Abinader, S. Choudhury, E. Tuomaala, and K. Doppler, "Performance Evaluation of LTE and Wi-Fi Coexistence in Unlicensed Bands," in Proc. IEEE Vehi. Technol. Conf. (VTC), June 2013, pp. 1-6.

[20] E. Almeida, A. Cavalcante, R. Paiva, F. Chaves, F. Abinader, R. Vieira, S. Choudhury, E. Tuomaala, and K. Doppler, "Enabling LTE/WiFi Coexistence by LTE blank subframe allocation," in Proc. IEEE Inter. Conf. on Commun. (ICC), June 2013, pp. 5083-5088.

[21] F. Chaves, E. Almeida, R. Vieira, A. Cavalcante, F. Abinader, S. Choudhury, and K. Doppler, "LTE UL Power Control for the Improvement of LTE/Wi-Fi Coexistence," in Proc. IEEE Vehic. Technol. Conf. (VTC), September 2013, pp. 1-6.

[22] NTT DOCOMO, "Views on LAA for Unlicensed Spectrum—Scenarios and Initial Evaluation Results," June 2014.

[23] CableLabs, "Cable Labs perspective on LTE-U Coexistence with Wi-Fi and Operational Modes form LTE-U," June 2014.

[24] SONY, "Requirements and Coexistence Topics for LTE-U," June 2014.

[25] N. Rupasinghe and I. Guvenc, "Licensed-assisted access for WiFi-LTE coexistence in the unlicensed spectrum," submitted to IEEE GLOBECOM Workshop on Emerging Technologies for 5G Wireless Cellular Networks, December 2014.

[26] V. Schmidt, "Random point processes: Models, characteristics, and structural properties," Sollerhaus Workshop, March 2006. [Online]. Available: http://www.mathematik.uni-ulm.de/stochastik/aktuelles/sh06/sh schmidt.pdf

[27] J. Andrews, R. Ganti, M. Haenggi, N. Jindal, and S. Weber, "A primer on spatial modeling and analysis in wireless networks," Communications Magazine, IEEE, vol. 48, no. 11, pp. 156-163, November 2010.

[28] M. E. Harmon and S. S. Harmon, "Reinforcement learning: a tutorial," WL/AAFC, WPAFB Ohio, vol. 45433, 1996.

[29] P. Auer, N. Cesa-Bianchi, and P. Fischer, "Finite-time analysis of the multi-armed bandit problem," Machine learning, vol. 47, no. 2-3, pp. 235-256, 2002.

[30] S. Ross and B. Chaib-draa, "Satisfaction equilibrium: Achieving cooperation in incomplete information games," in Advances in Artificial Intelligence, 2006, pp. 61-72.

[31] S. Ross and B. Chaib-draa, "Learning to play a satisfaction equilibrium," in Workshop on Evolutionary Models of Collaboration, 2007

[32] M. Simsek, M. Bennis, and A. Czylwik, "Dynamic inter-cell interference coordination in HetNets: A reinforcement learning approach," in Proc. IEEE Global Communications Conference (GLOBECOM), December 2012, pp. 5446-5450.

[33] A. Galindo-Serrano and L. Giupponi, "Managing femto to macro interference without X2 interface support through POMDP," Mobile Networks and Applications, vol. 17, no. 5, pp. 633-647, 2012.

[34] M. Simsek, A. Czylwik, A. Galindo-Serrano, and L. Giupponi, "Improved decentralized Q-learning algorithm for interference reduction in lte-femtocells," in Proc. Wireless Advanced (WiAd), London, UK, June 2011, pp. 138-143.

[35] A. Galindo-Serrano and L. Giupponi, "Distributed Q-learning for interference control in OFDMA-based femtocell networks," in Proc. IEEE Vehic. Technol. Conf. (VTC), Taipei, Taiwan, May 2010, pp. 1-5.

[36] A. Galindo-Serrano and L. Giupponi, "Self-organized femto-to-macro interference coordination with partial information," in Proc. IEEE Int. Symp. Personal, Indoor and Mobile Radio Communications (PIMRC) Workshops, 2013, pp. 111-116.

[37] A. Galindo-Serrano and L. Giupponi, "Self-organized femtocells: a fuzzy Q-learning approach," Wireless networks, vol. 20, no. 3, pp. 441-455, 2014.

[38] M. Bennis and D. Niyato, "A Q-learning based approach to interference avoidance in self-organized femtocell networks," in Proc. IEEE GLOBECOM Workshops (GC Wkshps), 2010, pp. 706-710.

[39] M. Simsek, M. Bennis, and I. Guvenc, "Enhanced intercell interference coordination in HetNets: Single vs. multiflow approach," in Proc. IEEE Globecom Workshops (GC Wkshps), December 2013, pp. 725-729.

[40] M. Simsek, M. Bennis, and I. Guvenc, "Learning based frequency- and time-domain inter-cell interference coordination in HetNets," in submitted to IEEE Trans. Vehic. Technol. (2nd round major revision), May 2014.

[41] M. Simsek, M. Bennis, and I. Guvenc, "Mobility management in HetNets: A learning based perspective," submitted to EURASIP J. Wireless Commun. Networks, August 2014.

[42] M. Simsek, M. Bennis, and I. Guvenc, "Time and frequency domain e-ICIC with carrier aggregation in HetNets," Book chapter in "Design and Deployment of Small Cell Networks" (Editors: A. Anpalagan, M. Bennis, R. Vannithamby), Cambridge University Press, 2014.

[43] D. Liu, Y. Chen, K. K. Chai, T. Zhang, and M. Elkashlan, "Opportunistic user association for multiservice HetNets using Nash bargaining solution," Communications Letters, IEEE, vol. 18, no. 3, pp. 463-466, March 2014.

[44] B. Wu, Y. Feng, and H. Zheng, "Model-based Bayesian reinforcement learning in factored Markov decision process," Journal of Computers, vol. 9, no. 4, pp. 845-850, 2014.

[45] F. Doshi-Velez, J. Pineau, and N. Roy, "Reinforcement learning with limited reinforcement: Using Bayes risk for active learning in POMDPs," Artificial Intelligence, vol. 187, pp. 115-132, 2012.

[46] N. Vlassis, M. Ghavamzadeh, S. Mannor, and P. Poupart, "Bayesian reinforcement learning," in Reinforcement Learning, 2012, pp. 359-386.

[47] M. Wiering and M. van Otterlo, "Reinforcement learning: State of the art," Adaptation, Learning, and Optimization, vol. 12, 2012.

[48] Samsung, "Mobility support to pico cells in the co-channel HetNet deployment," Stockholm, Sweden, March 2010, 3GPP Standard Contribution (R2-104017).

[49] D. Lopez-Perez, I. Guvenc, and X. Chu, "Mobility enhancements for heterogeneous networks through interference coordination," in Proc. IEEE Wireless Communications and Networking Conf., Workshop on Broadband Femtocell Technologies, Paris, France, April 2012.

[50] D. L'opez-P'erez, I. Guvenc, and X. Chu, "Theoretical analysis of handover failure and ping-pong rates for heterogeneous networks," in Proc. IEEE Int. Workshop on Small CellWireless Networks (co-located with IEEE ICC), Ottawa, Canada, June 2012.

[51] K. Vasudeva, M. Simsek, and I. Guvenc, "Analysis of handover failures in HetNets with layer-3 filtering," in Proc. IEEE Wireless Commun. Networking Conf. (WCNC), Istanbul, Turkey, April 2014.

[52] M. Simsek, M. Bennis, and I. Guvenc, "Context-aware mobility management in HetNets: A reinforcement learning approach," submitted to IEEE GLOBECOM Workshops, December 2014.

[53] W. Chen, Y. Wang, and Y. Yuan, "Combinatorial multi-armed bandit: General framework, results and applications," in Proc. Int. Conf. Machine Learning (ICML), Atlanta, Ga., 2013.

[54] Y. Gai, B. Krishnamachari, and R. Jain, "Learning multiuser channel allocations in cognitive radio networks: A combinatorial multi-armed bandit formulation," in Proc. IEEE Int. Symp. New Frontiers in Dynamic Spectrum, April 2010, pp. 1-9.

[55] S. L. Scott, "A modern Bayesian look at the multi-armed bandit," Applied Stochastic Models in Business and Industry, vol. 26, no. 6, pp. 639-658, 2010.

[56] B. Settles, "Active learning literature survey," Technical Report, University of Wisconsin-Madison, vol. 52, pp. 55-66, 2010. [Online]. Available: http://csis.bits-pilani.ac.in/faculty/goel/coursematerial/Machine%20Learning/2013/Reading%20Material/settles.activelearning.pdf

[57] L. Huang, X. Liu, and X. Hao, "The power of online learning in stochastic network optimization," arXiv preprint arXiv:1404.1592, April 2014. [Online]. Available: http://arxiv.org/pdf/1404.1592.pdf

[58] T. L. Griffiths and Z. Ghahramani, "The indian buffet process: An introduction and review," The Journal of Machine Learning Research, vol. 12, pp. 1185-1224, 2011.

What is claimed is:

1. A method of managing interference and handover in a broadband, UAV-assisted heterogeneous network (BAHN), the BAHN comprising a plurality of base station devices and a master macrocell base station (MBS) device that is a base station control node of the BAHN, the method comprising:

determining, by the master MBS device, a candidate BAHN model from state data received from the base station devices of the BAHN, wherein the candidate BAHN model satisfies one or more factors including an interference metric, a load-balancing metric, a handover failure metric, a ping-pong probability metric, and a network throughput metric, wherein the base station devices include one or more of unmanned aerial base station (UABS) devices, macrocell base station (MBS) devices, small cell base station (SCBS) devices, and Cloud-RAN (C-RAN) base station devices;

capturing a random access channel (RACH) message, decoding the RACH message, and providing a real-time heat-map based on the RACH message;

depending on the candidate BAHN model, selecting, by the master MBS device, at least three model adjustments from a group consisting of:
 a) modifying a duty cycle or pattern of reduced-power resources;
 b) modifying a power reduction factor at the reduced-power resources;
 c) altering a range-expansion bias at one or more SCBS and UABS;
 d) modifying a scheduling threshold for transitioning user equipment devices to a different base station;
 e) modifying an operating state of UABS features; and
 f) aggregating a plurality of component carrier bands using a carrier aggregation feature of LTE;

performing, by the master MBS device, the at least three model adjustments; and organizing mobility management based on at least one of a three-dimensional location, a velocity, and a mobility management parameter.

2. The method of claim 1, wherein the plurality of component carrier bands comprise unlicensed bands,
 wherein one or more of LTE-LAA and LTE-U technologies utilize the unlicensed bands, and
 wherein at least one of the user equipment devices are simultaneously connected to a plurality of base station devices using one or more communication bands.

3. The method of claim 1, wherein one or more of the user equipment devices connect to the base station devices using a millimeter wave band.

4. The method of claim 1, wherein the determining of the candidate BAHN model comprises determining an optimized base station location distribution in the BAHN with a Poisson hardcore process, a mattern-cluster process, a Gibbs point process, or a Strauss point process.

5. The method of claim 1, wherein the BAHN comprises a public safety communications system,
 wherein determining the candidate BAHN model comprises applying different quality of service thresholds at first responder user equipment, victim user equipment, and regular user equipment, and
 wherein the base station devices exchange the state data using a backhaul channel.

6. The method of claim 5, wherein the backhaul channel is transmitted from a secondary base station device, and wherein the secondary base station device is not the origin of the state data.

7. The method of claim 1, wherein specific UABS devices in the BAHN comprise a planar antenna array, and wherein modifying the operating state of UABS features comprises enabling a 3-D beamforming capability using the planar antenna array in at least one of the specific UABS devices.

8. The method of claim 1, wherein the mobility management parameter is one or more of:
 a hysteresis margin;
 a range expansion bias; and
 a time-to-trigger timer.

9. The method of claim 1, wherein selecting the at least one model adjustment comprises an autonomous adjustment determined by a reinforcement learning component of the base station devices.

10. The method of claim 1, wherein the master MBS device selects and performs all of model adjustments a), b), c), d), e), and f).

11. An unmanned aerial base station (UABS) apparatus comprising:
 an unmanned aerial vehicle (UAV);
 a communications interface for communicating with a heterogeneous wireless network in accordance with wireless air interface standards, the heterogeneous wireless network including a plurality of base station devices and a master macrocell base station (MBS) device that is a base station control node of the heterogeneous wireless network;
 a processing system;
 one or more computer readable storage media; and
 program instructions stored on the one or more computer readable storage media that, when executed by the processing system, direct the processing system to:
  capture a random access channel (RACH) message, decode the RACH message, and provide a real-time heat-map based on the RACH message,
  select, by the master MBS device, at least three model adjustments from a group consisting of:

a) modifying a duty cycle, pattern, or power reduction factor of a reduced-power resource of the communications interface;
b) modifying an operating state of the communications interface;
c) altering a range-expansion bias of the communications interface;
d) modifying a scheduling threshold for transitioning user equipment devices to a different base station;
e) directing a control module of the UAV to modify a three-dimensional location or a velocity of the UAV; and
f) modifying a mobility management parameter at a connected user equipment;
perform, by the master MBS device, the at least three model adjustments; and
organize mobility management based on at least one of the three-dimensional location, the velocity, and the mobility management parameter.

12. The apparatus of claim 11, further comprising program instructions that, when executed by the processing system, direct the processing system to receive random access channel (RACH) signals of user equipment devices attaching to the wireless network and report the signals to the base station control node.

13. The apparatus of claim 11, further comprising program instructions that, when executed by the processing system, direct the processing system to, in response to determining that state data cannot be shared with other base station devices of the heterogeneous wireless network, use a reinforcement learning component to determine an autonomous model adjustment.

14. The apparatus of claim 11, wherein, when executed by the processing system, the program instructions direct the processing system to select and perform, by the mater MBS device, all of model adjustments a), b), c), d), e), and f).

15. A system for managing interference and handover in a broadband, UAV-assisted heterogeneous network (BAHN), the BAHN including a plurality of base station devices and a master macrocell base station (MBS) device that is a base station control node of the BAHN, the system comprising:
one or more computer readable storage media;
a processing system; and
program instructions stored on the one or more computer readable storage media that, when executed by the processing system, direct the processing system to:
receive state data from the base station devices of the BAHN, wherein the base station devices include unmanned aerial base station (UABS) devices, macrocell base station (MBS) devices, small cell base station (SCBS) devices, and Cloud-RAN (C-RAN) base station devices;
determine, by the master MBS device, a candidate BAHN model from the state data received from the base station devices of the BAHN, wherein the candidate BAHN model satisfies the factors including an interference metric, a load-balancing metric, a handover failure metric, a ping-pong probability metric, and a network throughput metric; and
capture a random access channel (RACH) message, decode the RACH message, and provide a real-time heat-map based on the RACH message;
depending on the candidate BAHN model, select, by the master MBS device, at least three model adjustments from a group consisting of:
a) modifying a duty cycle or pattern of reduced-power resources;
b) modifying a power reduction factor at the reduced-power resources;
c) altering a range-expansion bias at one or more SCBS and UABS;
d) modifying a scheduling threshold for transitioning user equipment devices to a different base station;
e) modifying a three-dimensional location or a velocity of at least one UABS;
f) modifying a mobility management parameter at a selected user equipment;
g) modifying an operating state of UABS features; and
h) aggregating a plurality of component carrier bands using a carrier aggregation feature of LTE;
performing, by the master MBS device, the at least three model adjustments; and
organize mobility management based on at least one of the three-dimensional location, the velocity, and the mobility management parameter.

16. The system of claim 15, wherein the determining of the candidate BAHN model comprises determining an optimized base station location distribution in the BAHN with a Poisson hardcore process, a mattern-cluster process, a Gibbs point process, or a Strauss point process.

17. The system of claim 15, wherein specific UABS devices in the BAHN comprise a planar antenna array, and wherein modifying the operating state of UABS features comprises enabling a 3-D beamforming capability using the planar antenna array in at least one of the specific UABS devices.

18. The system of claim 15, wherein the mobility management parameter is one or more of:
a hysteresis margin;
a range expansion bias; and
a time-to-trigger timer.

19. The system of claim 15, wherein selecting the model adjustment comprises an autonomous adjustment determined by a reinforcement learning component of the base station devices.

20. The system of claim 15, wherein, when executed by the processing system, the program instructions direct the processing system to select and perform, by the mater MBS device, all of model adjustments a), b), c), d), e), f), g), and h).

* * * * *